(12) United States Patent
Ogata et al.

(10) Patent No.: US 6,171,191 B1
(45) Date of Patent: Jan. 9, 2001

(54) ACTUATING DEVICE AND SYSTEM EXPLOITING THE ACTUATING DEVICE

(75) Inventors: Hiroki Ogata, Chiba; Toru Akazawa; Akihisa Ono, both of Tokyo, all of (JP)

(73) Assignee: Sony Computer Entertainment Inc. (JP)

( * ) Notice: Under 35 U.S.C. 154(b), the term of this patent shall be extended for 0 days.

(21) Appl. No.: 09/064,467

(22) Filed: Apr. 22, 1998

(30) Foreign Application Priority Data

Apr. 24, 1997 (JP) .................................................. 9-107942

(51) Int. Cl.[7] .............................. A63F 9/22; G06F 19/00
(52) U.S. Cl. ...................... 463/378; 273/148 B; 345/161
(58) Field of Search .................................. 463/37, 47, 30, 463/1, 36–38, 46; 273/148 R, 148 B; 345/156, 157, 161, 169

(56) References Cited

U.S. PATENT DOCUMENTS

| | | | |
|---|---|---|---|
| 5,036,239 | 7/1991 | Yamaguchi | 310/268 |
| 5,542,672 | * 8/1996 | Meredith | 463/37 |
| 5,669,818 | * 9/1997 | Thorner et al. | 463/47 |
| 5,691,898 | * 11/1997 | Rosenberg et al. | 463/38 |
| 5,734,373 | * 3/1998 | Rosenberg et al. | 463/38 |
| 5,853,326 | * 12/1999 | Goto et al. | 463/37 |
| 5,897,437 | * 4/1999 | Nishiumi et al. | 463/47 |

\* cited by examiner

*Primary Examiner*—Mark A Sagar
(74) *Attorney, Agent, or Firm*—Fulwider Patton Lee & Utecht, LLP

(57) ABSTRACT

A system having a machine having the function of reproducing an information recording medium, in which the system executes a program recorded on the recording medium by sending a machine actuating command signal to the machine by user actuation and by receiving signals from the machine. The system includes a main body portion of a machine, and a control unit for controlling the machine connected to the main body portion of the machine. The control unit has a housing, a plurality of control sections mounted on the housing actuated by the user with fingers, and a vibration motor mounted via a vibration motor mounting portion provided in the housing. The vibration motor includes a motor casing, a shaft rotatably supported by the motor casing, and an eccentric member mounted on the shaft. The eccentric member has a rotor and a plurality of coils mounted on the rotor which is mounted on the shaft. The vibration motor also includes a magnet mounted on the casing for facing the eccentric member, and a supplying member for supplying the driving current to each coil. The eccentric member is rotated when the driving current is supplied to each coil to cause vibrations of the vibration motor itself, with the vibrations being supplied via the housing to the user. This permits the vibrations to be felt by the user to make possible execution of the program excellent in simulated presence feeling.

19 Claims, 18 Drawing Sheets

ACTUATING DEVICE AND SYSTEM EXPLOITING THE ACTUATING DEVICE

BACKGROUND OF THE INVENTION

1. Field of the Invention

This invention relates to an actuating device for executing a pre-set program, such as a television game, by operation of plural actuating units. More particularly, it relates to an actuating device enabling execution of a pre-set program such as game with good simulated presence feeling.

2. Description of Related Art

Heretofore, a game machine employing a television receiver includes a main body unit connected to a television receiver used as a display device and an actuating device connected via a connection cable to the main body unit of the game machine for controlling the display character displayed on a display screen of the television receiver.

The main body unit of the game machine has enclosed therein a disc driving unit for reproducing an optical disc as a recording medium having a game program recorded thereon and a picture processor for displaying a display character on the screen of the television receiver along with the background.

The actuating device connected to the main body unit of the game machine is provided with plural actuating buttons. The operator operates plural actuating buttons provided on the actuating device for entering the command information concerning the operation of a display character displayed on the screen of the television receiver to control the movement direction of the display character represented on the screen by way of executing the game.

The actuating device connected to this type of the game machine is used by being gripped with the hand or finger. Such an actuating device is in use in which a bearing indicating actuating unit having a cross-shaped or circular bearing indicating actuating button and a function setting executing unit having plural function setting executing buttons for setting the actuating functions of the display characters or executing the operations on one and the other sides of the main body unit, respectively. The bearing indicating actuating unit includes four switches, each having an operator which may be brought into or out of contact with a contact, arrayed at an angular interval of 90° to one another. These switches are selectively turned on and off by the cross-shaped or circular bearing indicating actuating button for moving the display character. For example, the display character is digitally moved in the direction along which the one of the four switches that is turned on is arrayed. The function setting executing unit has switches arrayed in association with the plural function setting executing buttons, so that, by turning on the switches associated with the function setting executing buttons, the display characters allocated to the respective buttons are set, or the function owned by the display character is executed.

The above-described conventional actuating device executes the game by actuating the plural actuating buttons provided on the main body unit of the apparatus to command the operation of the display character displayed on the display screen. Simply the display character represented on the display screen is visually recognized, while the sound radiated from the speakers provided on the television receiver is aurally recognized to execute the game. That is, the actuating device actuated by the user with his or her hand or arm movements is actuated substantially by the hand or finger to enter the unidirectional command signal to the main body unit of the game machine.

SUMMARY OF THE INVENTION

It is an object of the present invention to provide an actuating device for a game machine having the function executed by signals fed back from the main body unit of the game machine for enabling execution of the game with excellent simulated presence feeling.

It is another object of the present invention to provide an actuating device for a game machine enabling use of a game program having display characters capable of executing diversified motions or movements.

It is a further object of the present invention to provide an actuating device for a game machine enabling execution of a game with a good simulated presence feeling by the body feeling.

It is yet another object of the present invention to provide an actuating device for a game machine capable of efficiently transmitting vibrations to the user to enable reduction size of the apparatus itself.

In one aspect, the present invention provides a control unit connected to a machine having the function of reproducing an information recording medium, in which the control unit is used for executing a program recorded on the recording medium by sending an actuating command signal to the machine by user actuation and by receiving signals from the machine. The control unit includes a housing, a plurality of control sections mounted on the housing actuated by the user with fingers, a pair of handles diverging in a direction proceeding from the housing to the user, and a vibration motor mounted via a vibration member mounting portion provided within at least one of the housing and the handles. The handles are molded as-one with the housing and connected to and supported by both palms of the user's hands. The vibration motor includes a motor casing, a shaft rotatably supported by the motor casing, an eccentric member mounted on the shaft, a magnet mounted on the casing, the magnet being arranged facing the eccentric member and a supplying member for supplying the driving current to each coil. The eccentric member has a rotor and a plurality of coils mounted on the rotor, which is mounted on the shaft. The housing, the handles and the control sections are sized and arranged so as to allow actuation of the control sections by the user's fingers when the housing is supported by the user's palms. The eccentric member is rotated to cause vibrations of the motor itself when the driving current is supplied to each coil. These vibrations are transmitted to the user's palms via one of the housing and the handles.

In another aspect, the present invention provides a control unit connected to a machine having the function of reproducing an information recording medium, in which the control unit is used for executing a program recorded on the recording medium by sending an actuating command signal to the machine by user actuation and by receiving signals from the machine. The control unit includes a housing, a plurality of control sections mounted on the housing actuated by the user with fingers and a vibration motor mounted via a vibration member mounting member provided in the housing. The vibration motor includes a motor casing, a shaft rotatably supported by the motor casing, an eccentric member mounted on the shaft, a magnet mounted on the casing for facing the eccentric member and a supplying member for supplying the driving current to each coil. The eccentric member has a rotor and a plurality of coils mounted on the rotor which is mounted on the shaft. The eccentric member is rotated when the driving current is supplied to each coil to cause vibrations of the vibration motor itself, the vibrations being supplied via the housing to the user.

In still another aspect, the present invention provides a control unit connected to a machine having the function of reproducing an information recording medium, in which the control unit is used for executing a program recorded on the recording medium by sending an actuating command signal to the machine by user actuation and by receiving signals from the machine. The control unit includes a main body portion of a machine, and a control unit for controlling the machine connected to the main body portion of the machine. The control unit includes a housing, a plurality of control sections mounted on the housing actuated by the user with fingers, a pair of handles diverging in a direction proceeding from the housing to the user, a pair of handles molded as-one with the housing and connected to and supported by both palms of the user's hands, and a vibration motor mounted via a vibration member supporting portion provided within at least one of the housing and the handles. The vibration motor includes a motor casing, a shaft rotatably supported by the motor casing, an eccentric member mounted on the shaft, a magnet mounted on the casing for facing the eccentric member and a supplying member for supplying the driving current to each coil. The eccentric member has a rotor and a plurality of coils mounted on the rotor. The housing, the handles and the control sections are sized and arranged so as to allow actuation of the control sections by the user's fingers when the housing is supported by the user's palms, the eccentric member being rotated to cause vibrations of the motor itself when the driving current is supplied to each coil, the vibrations being transmitted to the user's palms via one of the housing and the handles.

In yet another aspect, the present invention provides a system having a machine having the function of reproducing an information recording medium, in which the system executes a program recorded on the recording medium by sending a machine actuating command signal to the machine by user actuation and by receiving signals from the machine. The system includes a main body portion of a machine, and a control unit for controlling the machine connected to the main body portion of the machine. The control unit has a housing, a plurality of control sections mounted on the housing actuated by the user with fingers, and a vibration motor mounted via a vibration motor mounting portion provided in the housing. The vibration motor includes a motor casing, a shaft rotatably supported by the motor casing, and an eccentric member mounted on the shaft. The eccentric member has a rotor and a plurality of coils mounted on the rotor which is mounted on the shaft. The vibration motor also includes a magnet mounted on the casing for facing the eccentric member, and a supplying member for supplying the driving current to each coil. The eccentric member is rotated when the driving current is supplied to each coil to cause vibrations of the vibration motor itself, with the vibrations being supplied via the housing to the user.

DESCRIPTION OF PREFERRED EMBODIMENTS

Figure 1:
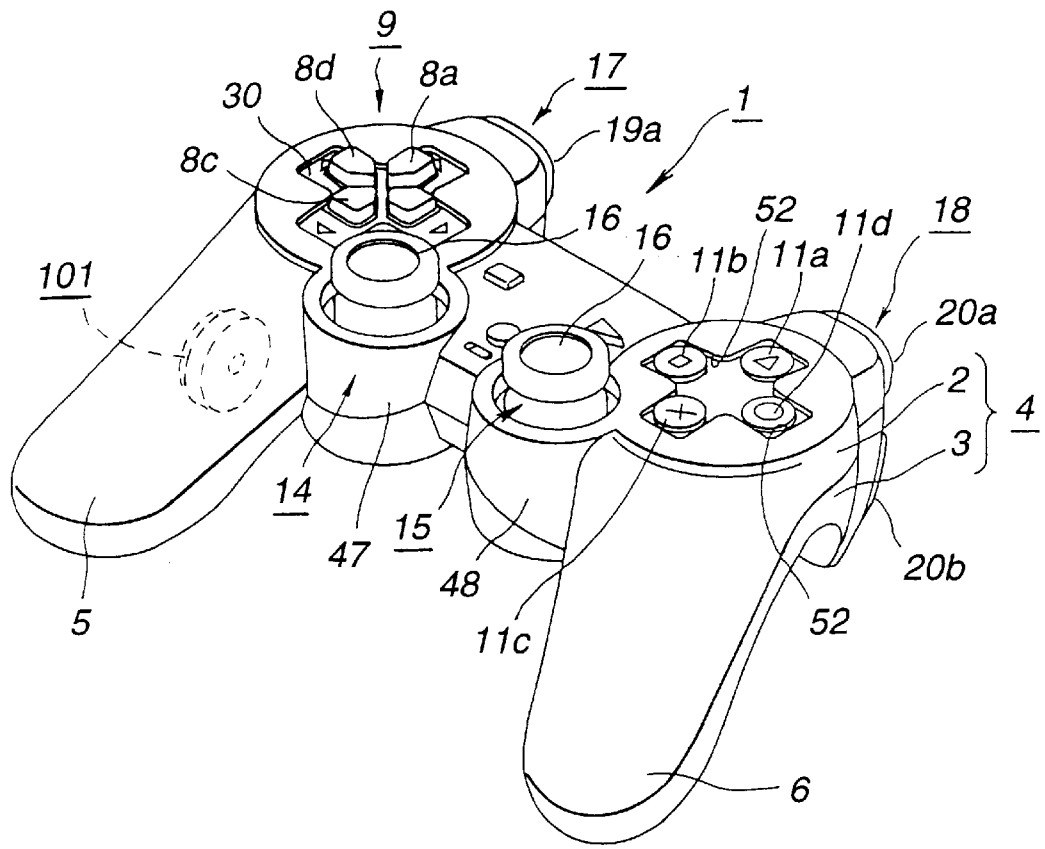
FIG. 1 is a perspective view showing an actuating device for a game machine according to the present invention.

Referring to the drawings, preferred embodiments of the present invention will be explained in detail.

The actuating device for the game machine is connected to a main body unit of the game machine housing therein a disc driving unit for reproducing an optical disc as a recording medium having a game program recorded thereon, and a picture processing device for displaying a display character on the screen of a television receiver along with the background picture in accordance with the game program recorded on the optical disc. The operation of the main body unit of the game machine is controlled for executing the game software recorded on the optical disc.

Figure 2:
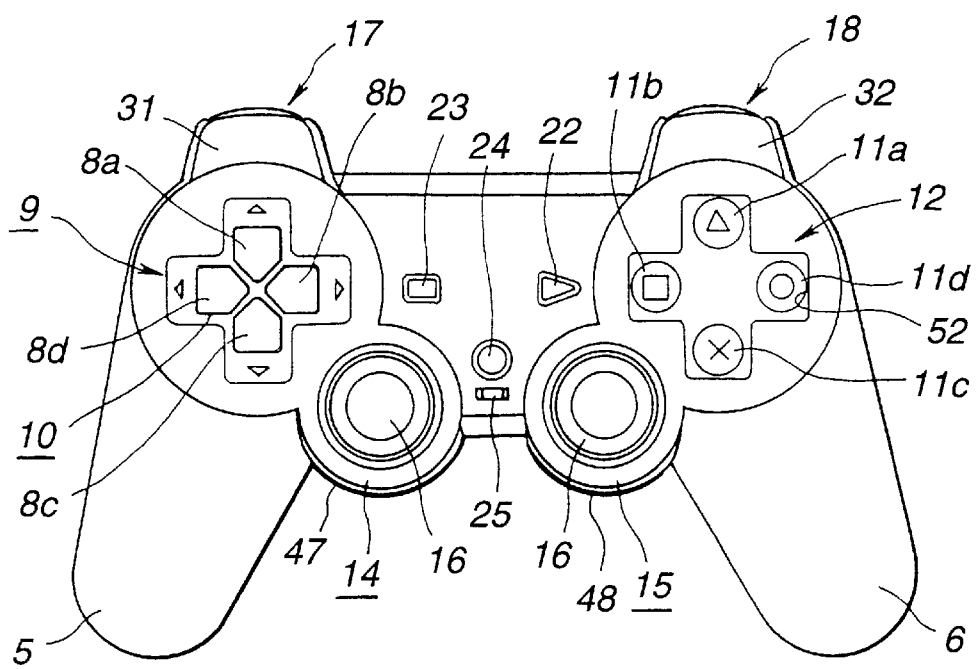
FIG. 2 is a plan view of the actuating device for a game machine.
Figure 3:
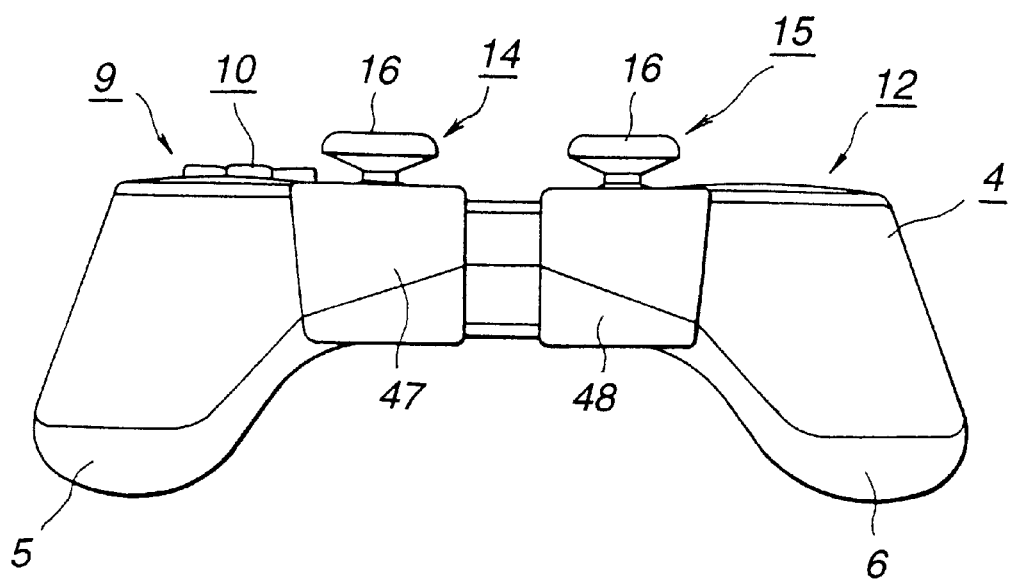
FIG. 3 is a back side view of the actuating device for a game machine.
Figure 4:
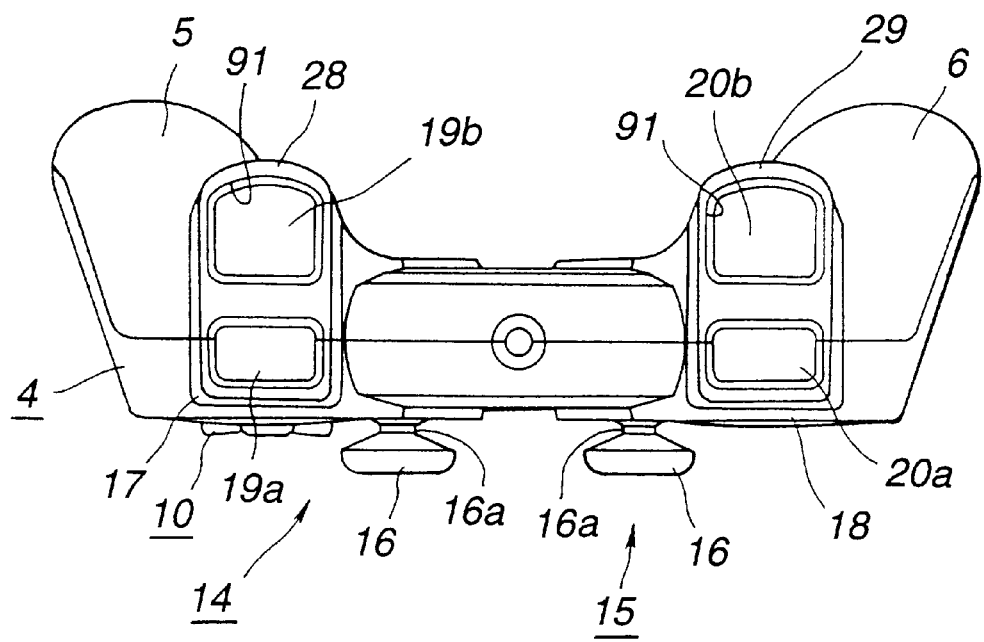
FIG. 4 is a front view of the actuating device for a game machine.
Figure 5:
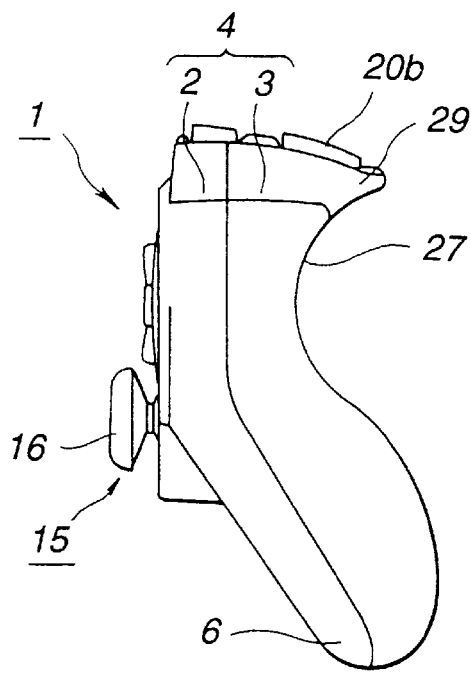
FIG. 5 is a right-hand side view of the actuating device for a game machine.
Figure 6:
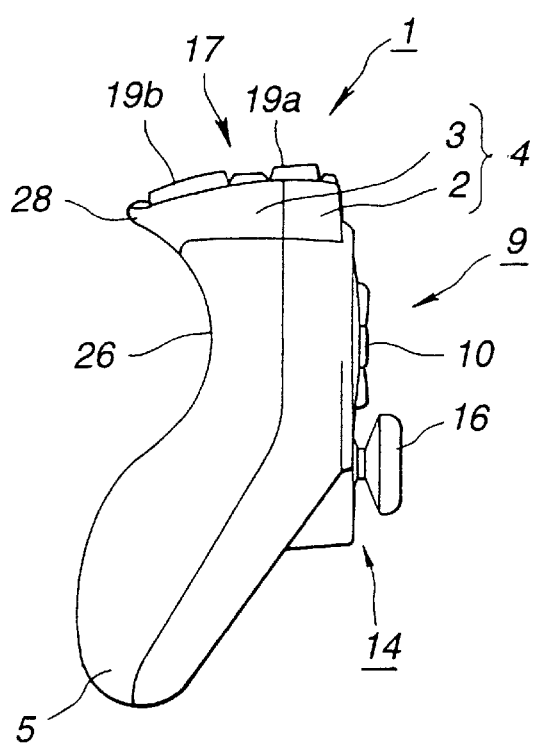
FIG. 6 is a left-hand side view of the actuating device for a game machine.

An actuating device 1 for the game machine according to the present invention includes a main body unit 4 comprised of an upper half 2 and a lower half 3 abutted to each other and interconnected by mounting means, such as set screws, as shown in FIG. 1. From a side of each end of the main body unit 4, a first grip 5 and a second grip 6 which, when the device 1 is connected to the main body unit of the game machine, are held in a wrapped fashion by left and right palms, protrude, as shown in FIGS. 1 and 2. These first and second grips 5, 6 protrude so as to be progressively spaced apart from each other and directed down towards the distal ends, as shown in FIGS. 2 to 4. For enabling gripping for prolonged time, the first and second grips 5, 6 are tapered from the connecting side to the main body unit 4 towards the distal ends, and are arcuately-shaped on the rim sides and distal ends, as shown in FIGS. 2, 5 and 6.

On one end of the main body unit 4 is arranged a first actuator 9 comprised of upwardly protruding first to fourth thrusting operators 8a, 8b, 8c and 8d at an interval of 90° relative to one another. The first to fourth thrusting operators 8a, 8b, 8c and 8d, making up the first actuator 9, are formed as-one with a rotation actuating member 10, adapted for being rotated about its center, and are arranged at an interval of 90° about the center of rotation of the rotation actuating member 10 as the center of rotation. That is, the first to fourth thrusting operators 8a, 8b, 8c and 8d are connected as-one to one another. The first actuating section 9 is provided with switch elements as signal input devices in association with the first to fourth thrusting operators 8a, 8b, 8c and 8d. The first actuating section 9 operates as a bearing indicating controller for controlling the direction of movement of the display character, such that, by selectively thrusting the first to fourth thrusting operators 8a, 8b, 8c and 8d to turn switch elements associated with the first to fourth thrusting operators 8a, 8b, 8c and 8d on or off, the display character is moved in the arraying direction of the thrust operators 8a to 8d.

On the opposite side of the main body unit 4 is arranged a second actuator 12 comprised of upwardly protruding first to fourth thrusting operators 11a, 11b, 11c and 1d at an interval of 90° relative to one another. The first to fourth thrusting operators 11a to 11d are designed as independent members and switch elements as signal input elements are provided in association with the thrust elements 11a to 11d. The second actuator 12 operates as function setting executing unit which, by turning on switches associated with the first to fourth thrusting operators 11a, 11b, 11c and 11d, operate for setting the functions of the display characters allocated to the first to fourth thrusting operators 11a, 11b, 11c 1and 11d or executing the functions owned by the display characters.

The actuating device 1 is provided with third and fourth operating sections 14, 15 in facing relation to each other on the corners of the connecting sides to the main body unit 4 corresponding to the proximal ends of the first grip 5 and the second grip 6. These third and fourth operating sections 14, 15 are provided with a rotation operator 16 rotatable through 360° about a pivot 16a as the center of rotation and a signal input terminal, such a variable resistor, actuated by the rotation operator 16. That is, the rotation operator 16 is mounted on the distal end of the pivot 16a, adapted for being reset to a neutral position by a biasing member, and is rotated through 360° about the center of rotation of the pivot 16a as the center of rotation. These third and fourth operating sections 14, 15 are used as operators for enabling, on rotating the rotation operator 16, such operations as the inputting of command signals which command analog movements such as rotating and simultaneously moving the display characters, moving the display character with variable speed, or modifying the shape of the display characters.

On left and right ends on the front side of the main body unit 4 opposite to the back side provided with the first and second grips 5, 6, there are arranged a fifth operator 17 and a sixth operator 18. The fifth operator 17 and the sixth operator 18 are provided with first and second thrust operators 19a, 19b, 20a, 20b, respectively. The fifth and sixth actuators 17, 18 operate, on turning on the switch associated with the first and second thrusting operators 19a, 19b, 20a, 20b, for setting the functions of the display characters allocated to the thrust operators 11a to 11d or executing the functions owned by the display characters. Between the first actuator 9 and the second actuator 12 of the main body unit 4, there are provided side-by-side a start switch 22 for commanding the starting of a game and a selection switch 23 for selecting the relative difficulty of the game in readiness for starting the game. Between the third and fourth operating sections 14, 15 on the upper surface of the main body unit 4, there are provided a mode selection switch 24 for selecting the operating modes of the third and fourth operating sections 14, 15 and a display 25 for displaying the operating modes of the third and fourth operating sections 14, 15. This display 25 is constituted by a light-emitting element, such as LED. By selectively setting the mode selection switch 24, an operating mode enabling the inputting of a command signal from the third and fourth operating sections 14, 15 or an operating mode disabling the inputting of a command signal from the third and fourth operating sections 14, 15 is selected, and further an operating mode for enabling the inputting of the command signal from the third and fourth operating sections 14, 15 and for switching between the function of the first to fourth thrusting operators 11a, 11b, 11c and 11d of the second actuator 12 and the function of the first and second thrusting operators 19a, 19b, 20a, 20b of the fifth and sixth actuators 17, 18, is selected. The display 25 is flashed depending on the state of these operating modes, while the display light is switched.

Figure 7:
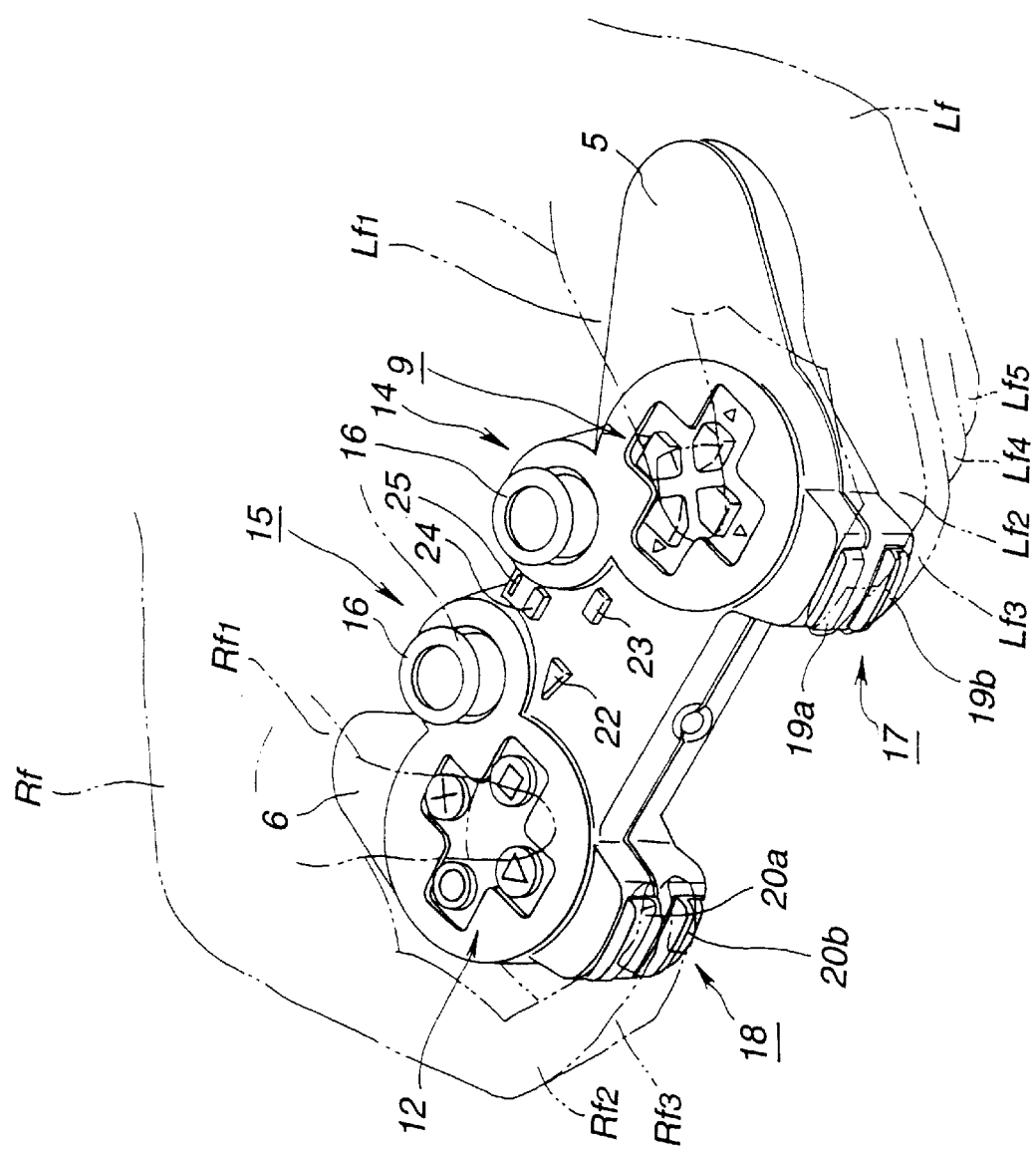
FIG. 7 is a perspective view showing the use state of the actuating device for a game machine.

The lower side of the main body unit 4 is formed with engagement recesses 26, 27 engaged by portions of hand or finger Rf, Lf when the first grip 5 and/or the second grip 6 is gripped by hand or finger Rf, Lf, as shown in FIG. 7. These engagement recesses 26, 27 are formed as smoothly curved reentrant portions, as shown in FIGS. 5 and 6.

In association with the engagement recesses 26, 27 on the front side of the main body unit 4 are dependingly formed finger supports 28, 29, as shown in FIGS. 5 and 6. Specifically, the finger supports 28, 29 are protuberantly formed from the lower ends of swollen-out portions 31, 32 on both sides on the front side of the main body unit 4 provided with the fifth and sixth actuators 17, 18.

The actuating device 1, comprised of the first and second grips 5 and 6 protruding from the main body unit 4, according to the present invention, can be gripped by holding the first and second grips 5 and 6 in a wrapping fashion by both palms, as shown in FIG. 7, so that there is no necessity to support the main body unit 4 with fingers, such that ten at the maximum and at least six fingers of both hands can be moved freely. For example, if the first and second grips 5 and 6 are held in a wrapping manner by the palms of both hands, as shown in FIG. 7. The thumb fingers Rf1, Lf1 of both hands can be extended over the rotation operators 16 of the third and fourth operating sections 14, 15, first to fourth thrusting operators 8a, 8b, 8c and 8d of the first actuator 9 and over the first to fourth thrusting operators 11a, 11b, 11c and 11d of the second actuator 12 for selectively thrusting the first to fourth thrusting operators 8a, 8b, 8c and 8d and the first to fourth thrusting operators 11a, 11b, 11c and 11d. In particular, since the rotation operators 16 of the third and fourth operating sections 14, 15 are arranged facing the proximal ends, corresponding to the connecting sides to the main body unit 4, of the first and second grips 5 and 6 gripped in a wrapping manner by the palms of both hands, the rotation operators 16 are located closest to the left and right thumb fingers 5 and 6 when the first and second grips 5 and 6 are gripped by the left and right hands. Accordingly, the rotation operators 16 can be easily rotated with the thumb fingers Rf1, Lf1.

Also, when the first and second grips 5 and 6 are held in a wrapping manner with both palms, the index fingers Rf2, Lf2 and middle fingers Rf3, Lf3 of left and right hands can be extended to positions enabling selective thrusting of the first and second thrusting operators 19a, 19b, 20a, 20b of the fifth and sixth actuators 17, 18.

When the actuating device 1 is held by the fingers, as described above, the main body unit 4 can be held in a proper position because the first and second grips 5 and 6 are wrapped with both palms and fourth fingers Rf4, Lf4 of both hands can be retained by the finger supports 28, 29 an these fingers are engaged in the engagement recesses 26, 27. The fingers can be set in correct position n register with the first to sixth actuators 9, 12, 14, 15, 17 and 18 for realizing correct actuation.

Figure 8:
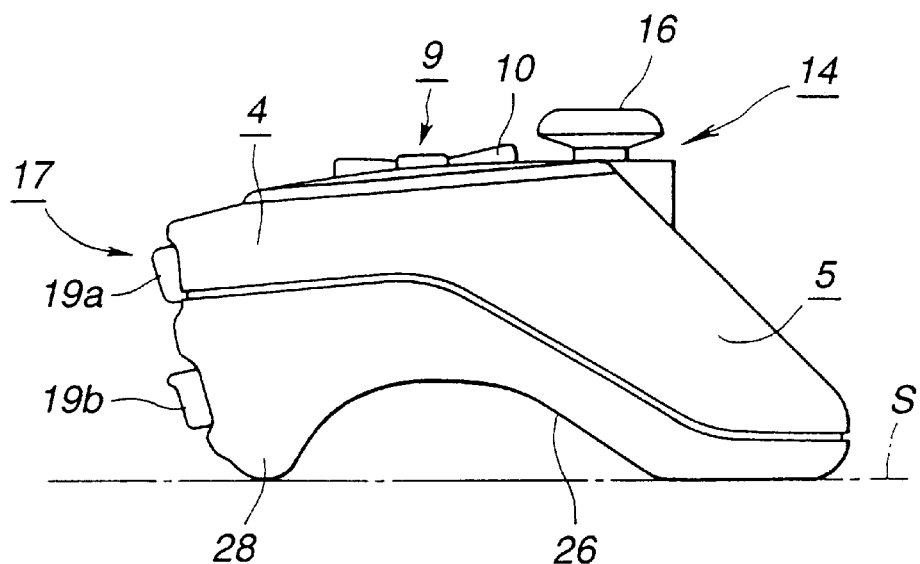
FIG. 8 is a side view showing the state of using the actuating device for a game machine set on a mounting surface.

Also, the actuating device 1 of the present invention can be set on a planar setting surface S, such as a table, without being gripped by hands and fingers, as shown in FIG. 8. The actuating device 1 is designed so that, when the actuating device 1 is set on the setting surface S, with the distal ends of the first and second grips 5 and 6 and the distal ends of the finger supports 28, 29 as supports, the actuating surfaces of the first to fourth thrusting operators 8a, 8b, 8c and 8d of the first actuator 9, first to fourth thrusting operators 11a, 11b, 11c and 11d of the second actuator 12 and the rotation operators 16, 16 of the third and fourth operating sections 14, 15 will be substantially planar to the setting surface S. Thus, with the actuating device 1 of the present invention set on the planar setting surface S, the user can set his or her hand on the setting surface S to support the first and second grips 5 and 6 with his or her palm to actuate the first to sixth actuators 9, 12, 14, 15, 17 and 18 using his or her free fingers.

Figure 10:
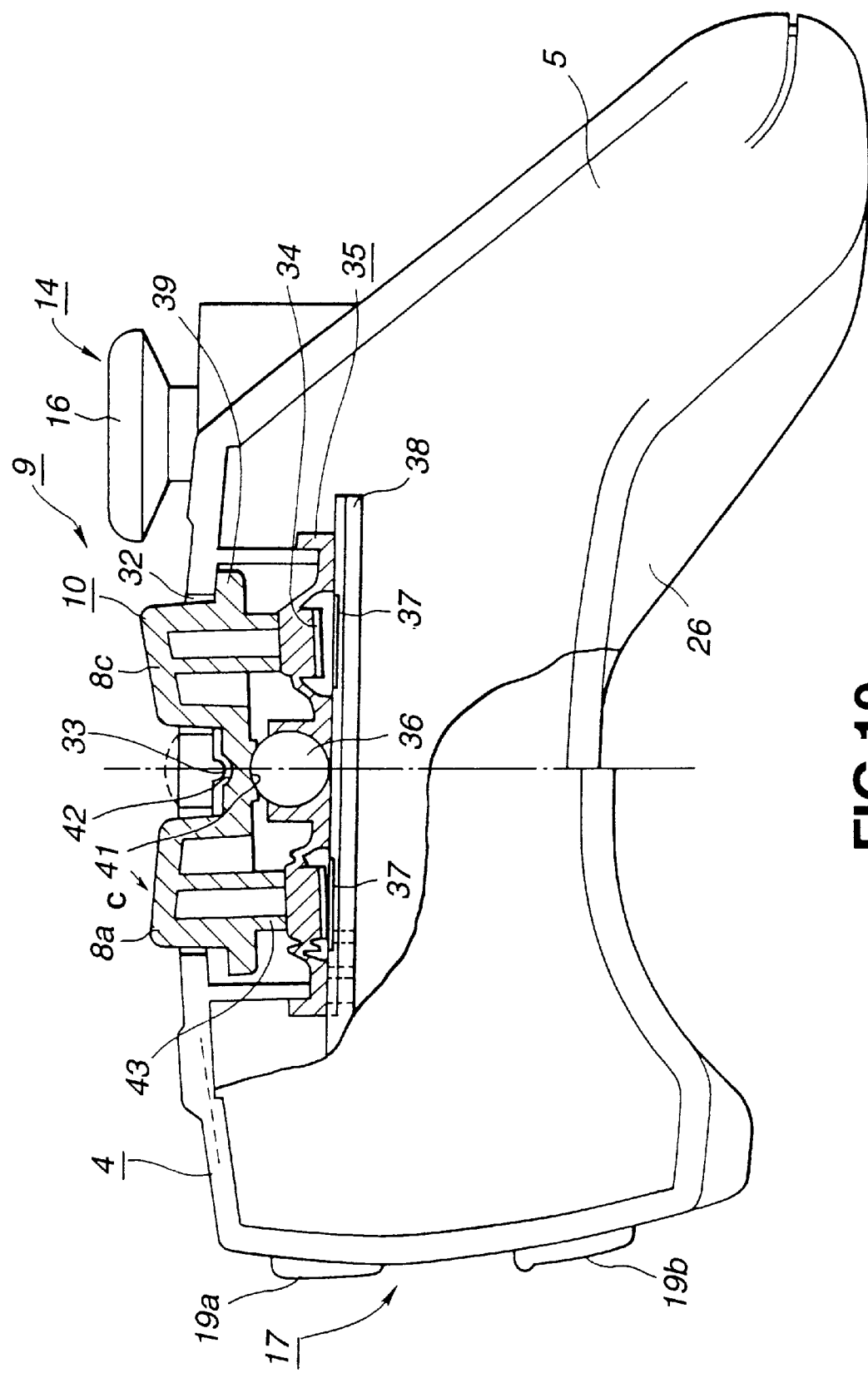
FIG. 10 is a partial cross-sectional view showing the first actuating unit.

The first actuator 9 of the actuating device 1 according to the present invention is explained more specifically. The first actuator 9 is arranged on one end on the upper side of the main body unit 4 so that the first to fourth thrusting operators 8a, 8b, 8c and 8d provided on the rotation actuating member 10 will protrude into a substantially cross-shaped recess 30. The upper, lower, left-side and right-side of the cross-shaped recess 30 are formed with bearing indicating display potions 31a, 31b, 31c, 31d. Inwardly of these bearing indicating display potions 31a to 31d, four openings 32 for allowing the first to fourth thrusting operators 8a, 8b, 8c and 8d to protrude on the upper surface side of the main body unit 4 are arrayed at right angles to each other. Centrally of these openings 32 is formed a center support boss 33 adapted for supporting the center portion of the upper surface of the rotation actuating member 10, as shown in FIG. 10. This central support boss 33 is formed as-one with the inner surface of the upper surface of the main body unit 4. In register with the rotation actuating member 10, an elastic member 35 is provided which has four movable contacts 34 thrust by the first to fourth thrusting operators 8a, 8b, 8c and 8d. Centrally of the elastic member 35 is held a fulcrum member 36, such as a steel ball, for supporting the center portion of the lower surface of the rotation actuating member 10. Facing the elastic member 35 is mounted a circuit board 38 having four fixed contacts 37 that may be brought into or out of contact with the movable contacts 34.

Figure 9:
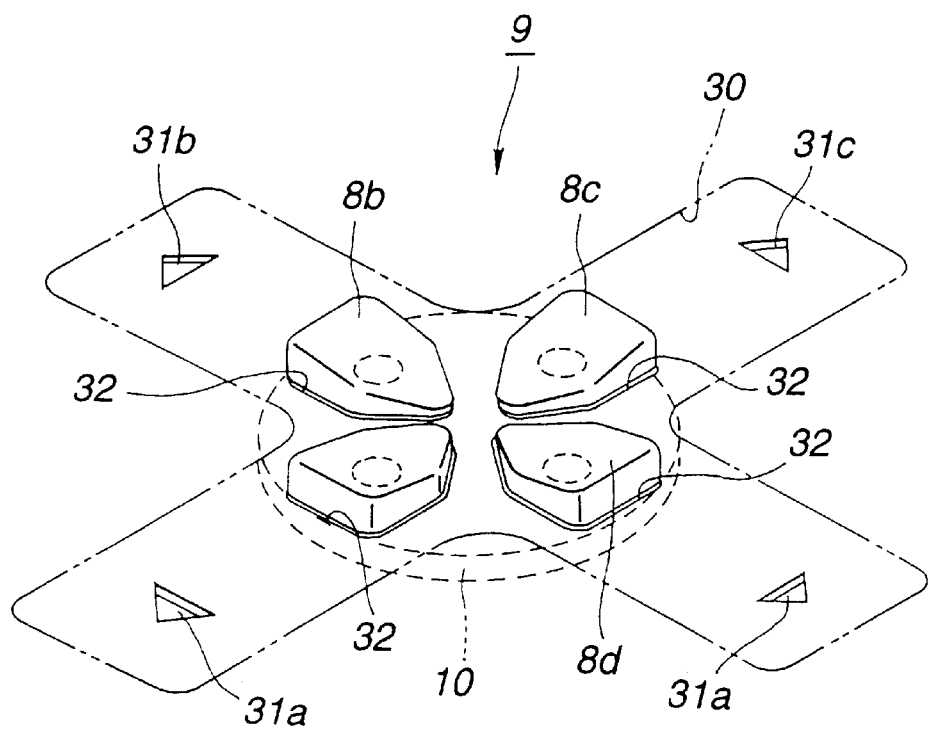
FIG. 9 is a perspective view showing essential parts of a first actuating unit.

Referring to FIGS. 9 and 10, the rotation actuating member 10 making up the first actuator 9 includes a circular base portion 39, the first to fourth thrusting operators 8a, 8b, 8c and 8d formed as-one with the upper portion of the circular base portion 39 and a first recess 41 lying below the center of the circular base portion 39 for engaging with the spherical surface of the spherically-shaped fulcrum member 36. The rotation actuating member 10 also includes a second recess 42 lying above the center of the circular base portion 39 for engaging with the spherical surface of the spherically-shaped fulcrum member 36, and a contact guide 43 protuberantly formed below the circular base portion 39 for thrusting the back side of the movable contact 34 of the elastic member 35. The first to fourth thrusting operators 8a, 8b, 8c and 8d, formed as-one with the rotation actuating member 10, are formed above the circular base portion 39 so that the facing ends thereof are tapered and are increased progressively in thickness from the center to the outer sides, as shown in FIG. 9, and are protruded from the upper surface of the main body unit 4 via the openings 32.

The elastic member 35 is clamped between the circuit board 38 and the rotation actuating member 10, and is provided with a number of the movable contacts 34 corresponding to the number of the first to fourth thrusting operators 8a to 8d.

The pivot 36 is spherically-shaped and is arranged at a mid portion of the rotation actuating member 10 in register with the center support boss 33 so as to be engaged in a first recess 41 formed centrally of the rotation actuating member 10.

If the rotation actuating member 10 is arranged on the main body unit 4, the first to fourth thrusting operators 8a to 8d are arranged radially with the circular base portion 39 as the center, and progressively increased in height in a direction from the facing ends towards the opposite outer ends. Thus, if the finger is set in a mid portion of the recess 30 surrounded by the first to fourth thrusting operators 8a to 8d, the relative position can be easily discerned by the feeling at the finger ends based on the step difference between the center area and the first to fourth thrusting operators 8a to 8d. In addition, if the finger is shifted for switch actuation from the center of the recess 30 towards outside, it can be discerned which one of the first to fourth thrusting operators 8a to 8d is being thrust based solely on the tactile feeling.

Figure 11:
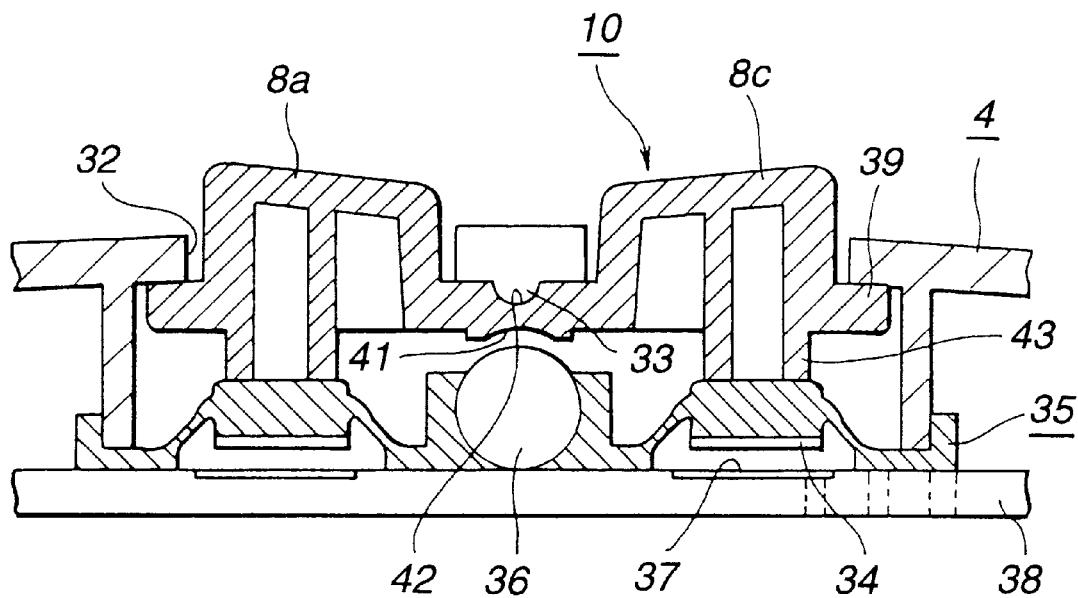
FIG. 11 is a cross-sectional view showing the inactive states of the first to fourth thrusting operators making up the first actuating unit.

If, in the first actuator 9, none of the first to fourth thrusting operators 8a to 8d, is thrust, the rotation actuating member 10 is uplifted via the contact guide 43, under the bias of the elastic member 35, as shown in FIG. 11, with the spherically-shaped recess 42 of the rotation actuating member 10 being then engaged by the central boss 33. Simultaneously, the rim of the circular base portion 39 is retained by the end of the opening 32, with the rotation actuating member 10 being retained in an initial position with the first to fourth thrusting operators 8a to 8d being outwardly protruded outwardly of the upper surface of the main body unit 4.

Figure 12:
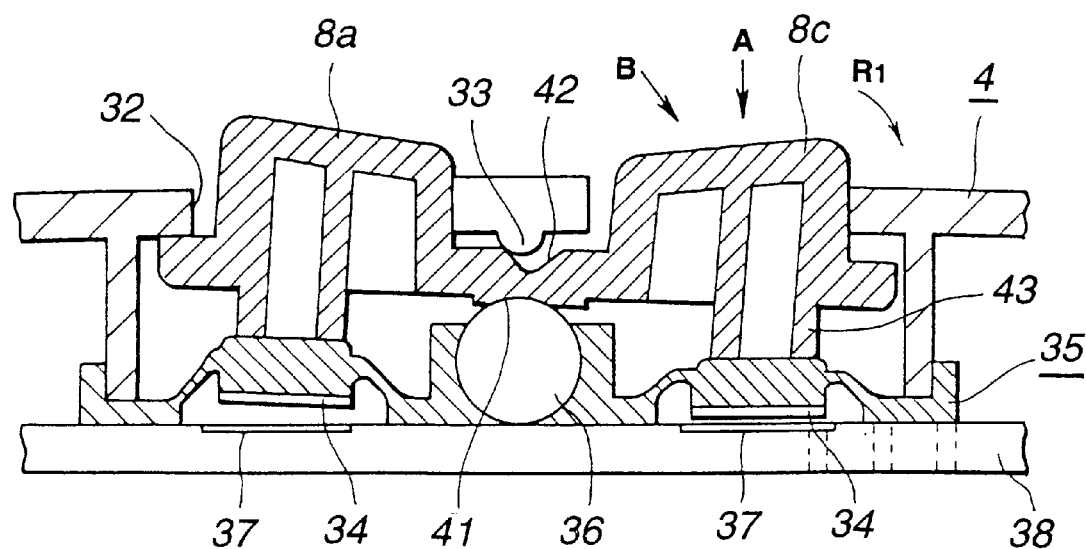
FIG. 12 is a cross-sectional view showing the second thrusting operators being thrust.
Figure 13:
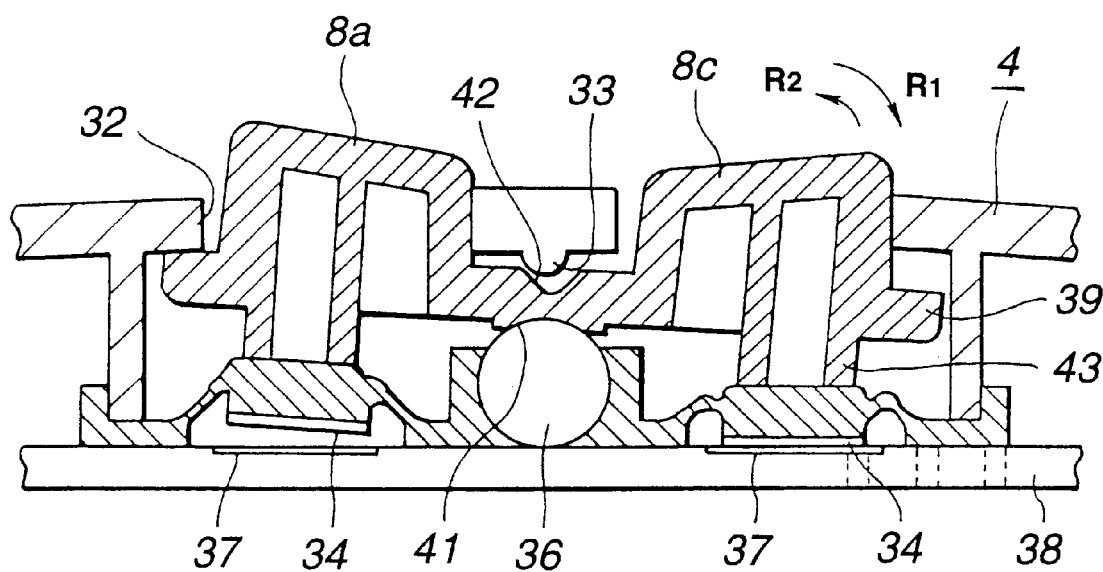
FIG. 13 is a cross-sectional view showing the state in which the second thrust operator of the first actuating unit has been thrust.

If, with the first to fourth thrusting operators 8a to 8d in the initial position, the third thrust element 8c is thrust in the directions indicated by arrows A or B in FIG. 12, the rotation actuating member 10 is rotated in the direction indicated by arrow R1 or rightwards in FIG. 12, with the first recess 41 being rotated on the spherical surface of the fulcrum member 36, for thrusting the elastic member 35 downwards by the third thrust operator 8c. If the third thrust operator 8c is thrust further, the rotation actuating member 10 is further rotated in the direction indicated by arrow R1 in FIG. 13, about the fulcrum member 36 as the center of rotation, with the movable contact 34 contacting with the fixed contact 37 to set up the electrically connected state.

If the thrusting force applied to the third thrust operator 8c is released, the first recess 41, so far having a spherical surface contact with the spherically-shaped fulcrum member 36, is moved in a separating direction, under the bias of the elastic member 35. That is, the third thrust operator 8c is rotated in the direction indicated by arrow R2 in FIG. 13 for displacing the movable contact 34 away from the fixed contact 37. The third thrust operator 8c is rotated further in the direction indicated by arrow R2 in FIG. 13 until the center support boss 33 is engaged with the second recess 42. At this time, the rotation actuating member 10 is restored to the initial position indicated in FIG. 11.

If the first thrust operator 8a thrusts the front side of the main body unit 4 in the direction indicated by arrow C in FIG. 10, the elastic member 35 is deformed against the elastic force, so that the first thrust operator 8a is moved in the direction indicated by arrow C in FIG. 10, at the same time as the first recess 41 is rotated on the spherical surface of the fulcrum member 36, with the movable contact 34 contacting with the fixed contact 37 to set up the electrically connected state.

Meanwhile, the movable contact 34 and the fixed contacts 37 make up the switch element, such that, on separation or contact of the movable contact 34 relative to the fixed contacts 37, the switch is turned on or off to permit the inputting of a command signal of moving the display characters.

In the operation of the first to fourth thrusting operators 8a to 8d of the first actuator 9, since the spherically-shaped fulcrum member 36 is engaged with the similarly spherically-shaped first recess 41 to constitute a fulcrum point, the switching operation can be performed by changing the stroke of the rotation actuating member 10 by exploiting the contact between the spherically-shaped surfaces. Moreover, since the first to fourth thrusting operators 8a to 8d are mounted on the main body unit 4 in a split configuration, the thrusting direction of the first to fourth thrusting operators 8a to 8d is not limited to a fixed direction, such that a smooth switching operation may be realized by omnidirectional operations thus preventing fluttering of the rotation actuating member 10, shifting of the center position or distortion to improve operability.

The second actuator 12 of the actuating device 1 of the present invention is explained in more detail. This second actuator 12 includes a substantially cross-shaped recess 51 on the opposite side on the upper surface of the main body unit 4 and openings 52 on upper, lower, left-side and right-side corners of the recess 51. The first to fourth thrusting operators 11a, 11b, 11c and 11d, making up the second actuator 12, are arranged on the main body unit 4 so that the distal ends thereof protrude from the upper surface of the main body unit 4. Within the main body unit 4 are arranged switch elements thrust by the first to fourth thrusting operators 11a to 11d. These switch elements are turned on and off by the first to fourth thrusting operators 11a to 11d being thrust for inputting command signals for setting the operating functions of the display characters or executing the operations.

The end faces of the first to fourth thrusting operators 11a to 11d carry symbols such as □, X, ○ or Δ specifying the functions of the first to fourth thrusting operators 11a to 11d. In the present embodiment, the symbols □, X, ○ or Δ are affixed to the first to fourth thrusting operators 11a to 11d, respectively. Specifically, the third and fourth thrust operators 11c, 11d, located towards the second grip 6 when the second grip 6 is gripped, for facilitating operation by the thumb finger, are set for inputting command signals "yes" and "no" frequently used in executing the game, and the symbols ○ or X corresponding to the commands of "yes" and "no" are displayed for these third and fourth thrust operators 11c, 11d. Thus, even in the actuating device 1 having a large number of the actuators, the third and fourth thrust operators 11c, 11d, frequently used, are placed at the positions that can be actuated easily, thus improving the operability of the minimum number of the thrust operators required for executing the game.

The respective functions of the first to fourth thrusting operators 11a to 11d may be represented in colors. That is, the respective functions of the first to fourth thrusting operators 11a to 11d may be indicated by using different colors for the first to fourth thrusting operators 11a to 11d.

The third and fourth operating sections 14, 15 are now explained. These third and fourth operating sections 14, 15 are arranged in substantially circularly-shaped mounting portions 47, 48 formed at the facing positions of the corners of the connecting sides to the main body unit 4 corresponding to the proximal ends of the first and second grips 5 and 6.

Since the third and fourth operating sections 14, 15 are of identical structure, only the third operating section 14 is hereinafter explained.

Figure 14:
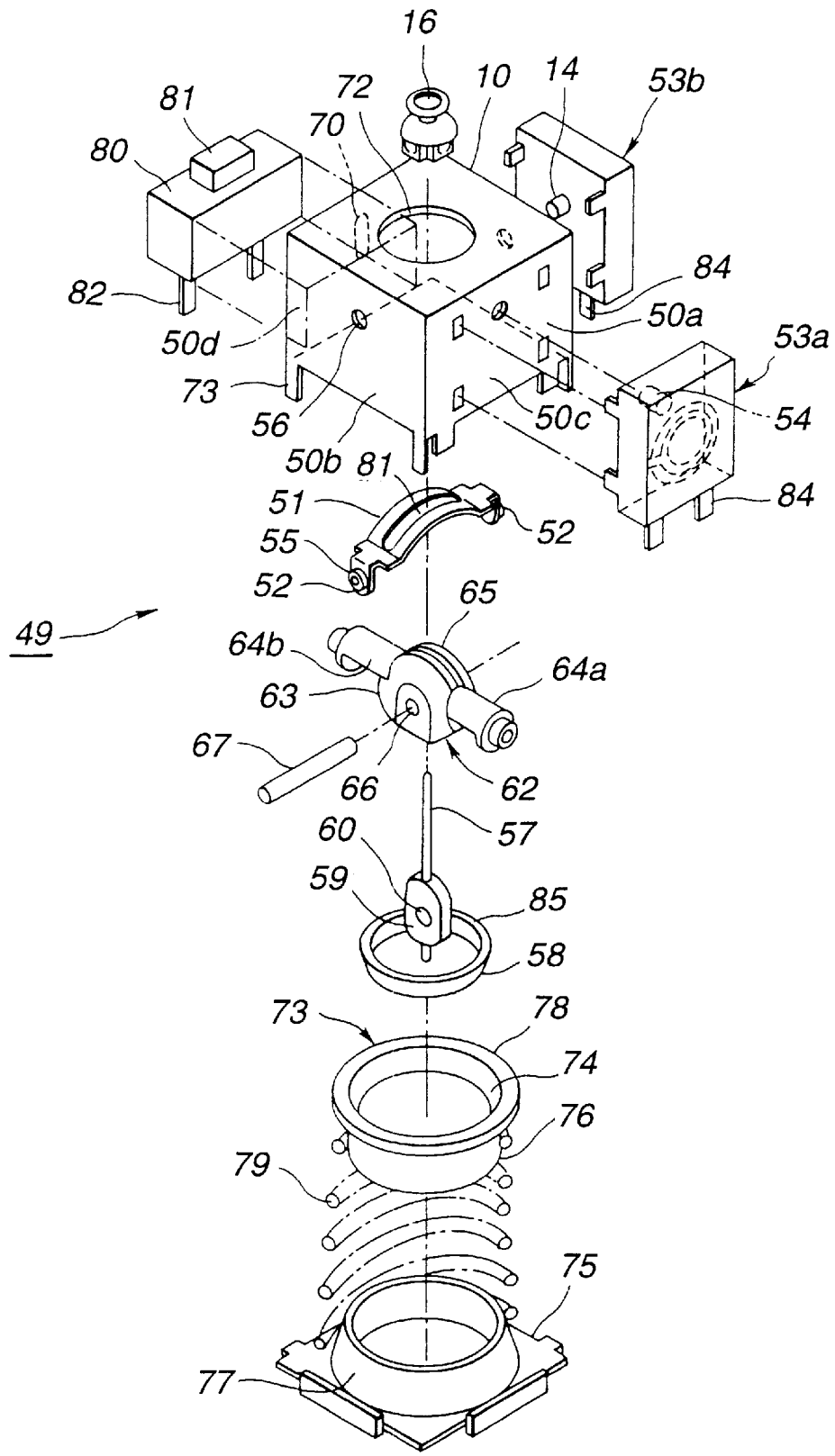
FIG. 14 is an exploded perspective view showing the multi-directional input device making up third and fourth actuating units.

The third operating section 14 has a multi-directional input device 50 shown in FIG. 14. This multi-directional input device 49 has a box-shaped upper frame 50 and an arched first interlocked member 51, as shown in FIG. 14. The first interlocked member 51 is rotatably mounted on the box-shaped upper frame 50 by having a rotary shaft 54 of a first variable resistor 53a of the rotary detector secured to a lateral surface 50a of the box-shaped upper frame 50 engaged in a warped portion 52 and by having a boss 55 provided on the warped portion 52 on the other end loosely fitted in an opening 56 formed in a lateral side 50b facing the lateral side 50a of the frame 50.

An actuating shaft 57 is mounted at a mid portion of the box-shaped upper frame 50. This actuating shaft 57 has a saucer-shaped operator 58 and a disk 59 on its lower end and at a mid portion, respectively. This disk 59 has an orifice 60, and a rotation operator 16 is mounted on the upper edge of the actuating shaft 57.

A second interlocked member 62 is arranged in the frame 50 for extending at right angles to the actuating shaft 57. This second interlocked member 62 has a center ball 63 from which extend transversely a pair of arm sections 64a, 64b. An elongated groove 65 is provided for extending from the upper surface to the lower surface of the ball 63. After introducing the actuating shaft 57 and the disk 59 into the elongated groove 65 and aligning the orifice 60 of the disk 59 with a lateral opening 66 formed in the ball 63, the pin 67 is inserted into the opening 66 and in the orifice 60 for mounting the actuating shaft 57 on the second interlocked member 62 so that the actuating shaft 57 can be rotated along the elongated groove 65 with the pin 67 as the center of rotation.

The second interlocked member 62 has an end of the arm section 64a engaged by a rotary shaft 54 of a second variable resistor 53b secured to the lateral side 50c of the box-shaped upper frame 50, while having the end of the opposite side arm section 64b fitted in an elongated opening 70 formed in a lateral side 50d of the box-shaped upper frame 50 so as to protrude outwards from a lateral side 50d of the box-shaped upper frame 50. The actuating shaft 57 is passed through the elongated groove 65 of the first interlocked member 51 so as to protrude outwards from an opening 72 formed in the upper frame 50.

The actuating shaft 57 is carried by a restoration member 73 having a recess in its surface in which is rotatably housed a saucer-like operator 58.

The lower end of the upper frame 50 carries a lower frame 75, the upper surface of which is formed with a support wall 77 for vertically movably housing a flange 76 of the restoration member 73. Between the bottom surface of the lower frame 75 and the outer rim 78 of the restoration member 73 is housed a spiral restoration spring 79. This restoration spring 79 biases the restoration member 73 upwards so that the end of the arm section 64b of the second interlocked member 62 is brought into pressure contact with the upper edge of a vertically elongated opening 70 formed in the lateral side 50d of the upper frame 50. The second interlocked member 62 is rotatably mounted on the upper frame 50 below the first interlocked member 51 for extending in a direction perpendicular to the first interlocked member 51.

On the lateral surface 50d of the upper frame 50 is mounted a thrust type switch element 80 actuated by thrusting the spring-biased thrust operator 81 against the bias of the spring. The thrust operator 81 of the switch element 80 faces an end 82 of the arm section 64b of the second interlocked member 62. This end 82 is protruded in the same direction as terminals 84 of first and second variable resistors 53a, 53b and a mounting leg 83 provided on the lower edge of the upper frame 50.

The operating state of the multi-directional input device 49 is now explained.

If the operator holds the rotation operator 16 to rotate it in an optional direction, the actuating shaft 57 is rotated about the intersection of the second interlocked member 62 and the axis of the pin 67 as the center of rotation. With rotation of the actuating shaft 57, the first interlocked member 51 and the second interlocked member 62 are rotated, whilst the rotary shafts 54 of the first and second variable resistors 53a, 53b are rotated for adjusting the resistance values.

The automatic restoration operation of the actuating shaft 57 is now explained.

Figure 15:
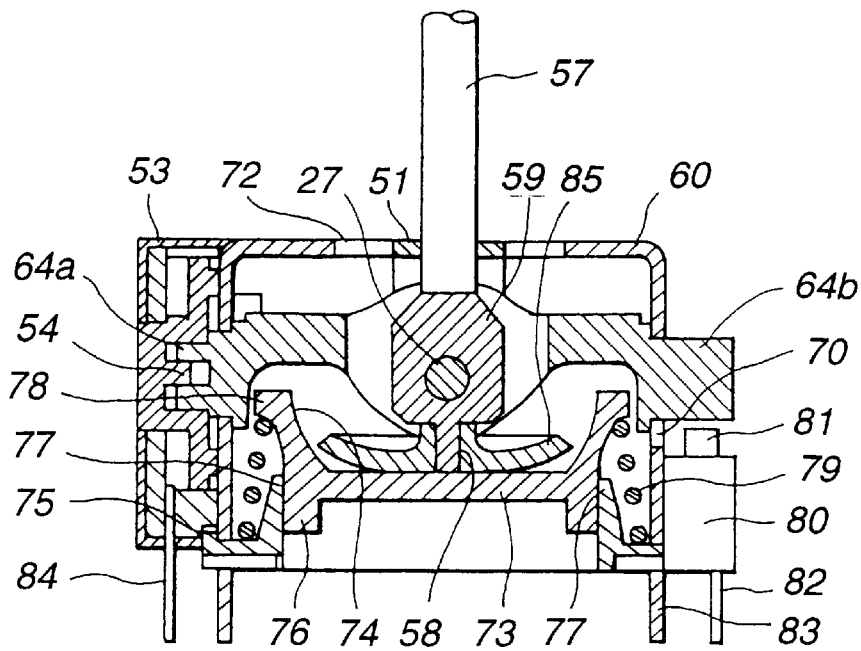
FIG. 15 is a cross-sectional view showing the multi-directional input device when the actuating shaft is in an initial state.
Figure 16:
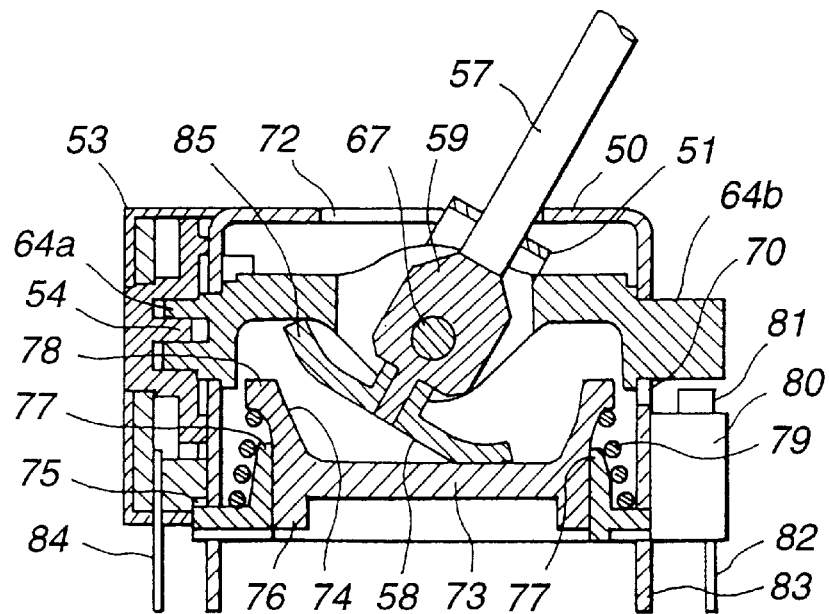
FIG. 16 is a cross-sectional view showing the multi-directional input device n rotation of the actuating shaft.

In a neutral state in which the actuating shaft 57 is not actuated, the actuating shaft 57 is set upright from the opening 72 in the upper surface of the upper frame 50, with the bottom surface of the actuator 58 and the inner bottom surface of the restoration member 73 being pressure-contacted with each other by the restoration spring 79. If the actuating shaft 57 is tilted clockwise, the flange 85, having an arcuate portion having a progressively increasing radius of curvature towards the outside of the actuator 58, thrusts the restoration member 73 into downward movement along the supporting wall 77 of the lower frame 75 against the force of the restoration spring 79, as shown in FIG. 16. When the actuating force applied to the actuating shaft 57 is annulled, the actuating shaft 57 is restored by the bias of the restoration spring 79 to the neutral state shown in FIG. 15, that is to the erect state of the actuating shaft 57.

The operation of the switch element 80 is explained with reference to FIGS. 17 and 18.

Figure 17:
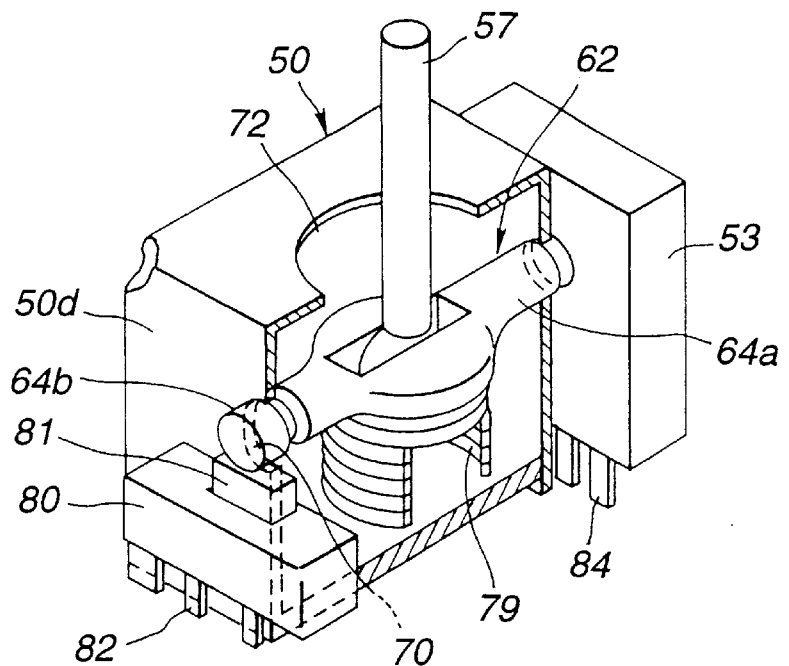
FIG. 17 is a perspective view, partially broken away, of the multi-directional input device showing the state of actuating the thrust type switch device.
Figure 18:
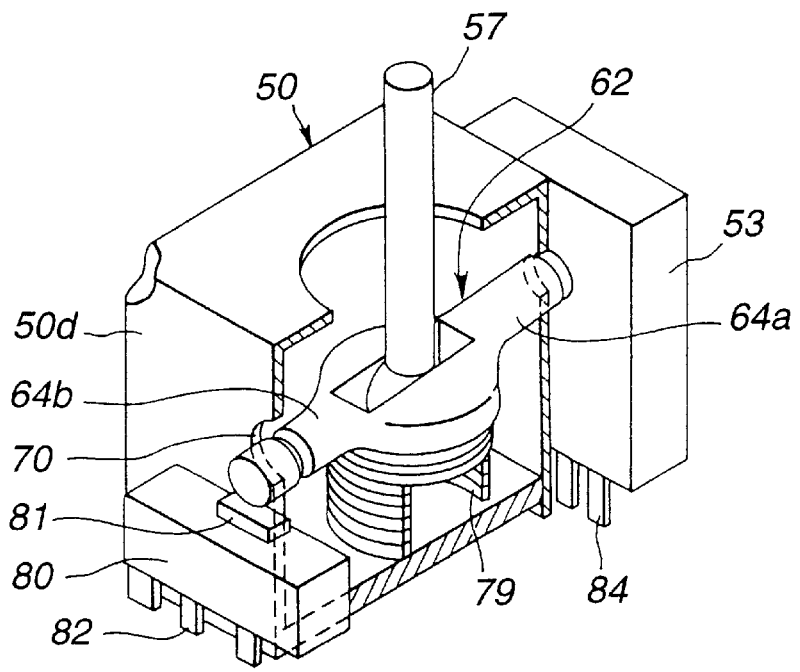
FIG. 18 is a perspective view, partially broken away, of the multi-directional input device showing the actuated state of the thrust type switch device.

When in the unactuated state, the actuating shaft 57 is in the position shown in FIG. 17, with the end of the arm section 64b of the second interlocked member 62 being spaced apart from the thrust operator 81 of the switch element 80, such that the end of the arm section 64b is kept in pressure contact with the upper edge of the vertically elongated opening 70 in the lateral side 50d of the frame 50 under the bias of the restoration spring 79. If the actuating shaft 57 is thrust from this state downwards, the end of the arm section 64b of the second interlocked member 62 is moved downwards along the vertically elongated opening 70, against the bias of the restoration spring 79, with the engagement point of the arm section 64a with the rotary shaft 54 of the first variable resistor 53a as the center of rotation, until the end of the arm section 64b is retained by the lower edge of the vertically elongated opening 70 operating as a stopper. During this time, the end of the arm section 64b thrusts the thrust operator 81 of the switch element 80 downwards to change over the switch element 80. If the thrusting on the actuating shaft 57 ceases, the end of the arm section 64b is restored to the state of FIG. 17, under the force of repulsion of the restoration spring 79, with the end of the arm section 64b being reset to the state of FIG. 17 in which the end of the arm section 64b compresses against the upper edge of the vertically elongated opening 70. Meanwhile, the switch element 80 is in operation even if the actuating shaft 57 is thrust when rotated in an optional direction.

By rotating the rotation operator 16, the first and second variable resistors 53a, 53b are operated, so that the third and fourth operating sections 14, 15 can furnish the command information for continuously moving the display characters in an accelerated fashion or rotated as the display characters are advanced, or changing the line of sight of the display characters.

The fifth and sixth actuators 17, 18, provided on the front side of the main body unit 4, are now explained.

The fifth and sixth actuators 17, 18 include first and second thrust operators 19a, 19b, 20a, 20b having distal portions thereof protruding from the front side of the main body unit 4 via a pair of openings 91 formed in the front sides of the swollen-out portions 31, 32 provided on both sides of the front side of the main body unit 4. Within the main body unit 4, there are provided switch elements in association with these thrust operators 19a, 19b, 20a, 20b.

The actuating device 1 for the game machine according to the present invention includes a vibration motor 101 driven by signals from the main body unit of the game machine during execution of the game for imparting vibration to the user.

Figure 19:
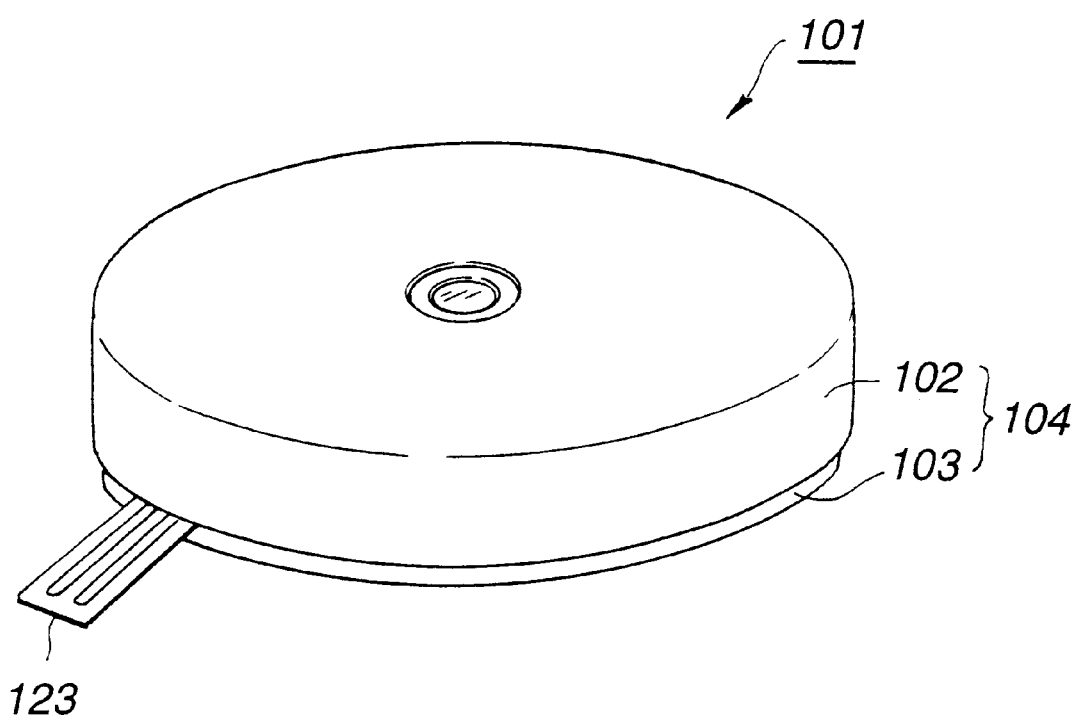
FIG. 19 is a perspective view showing a vibrating motor used for the actuating device for the game machine according to the present invention.
Figure 20:
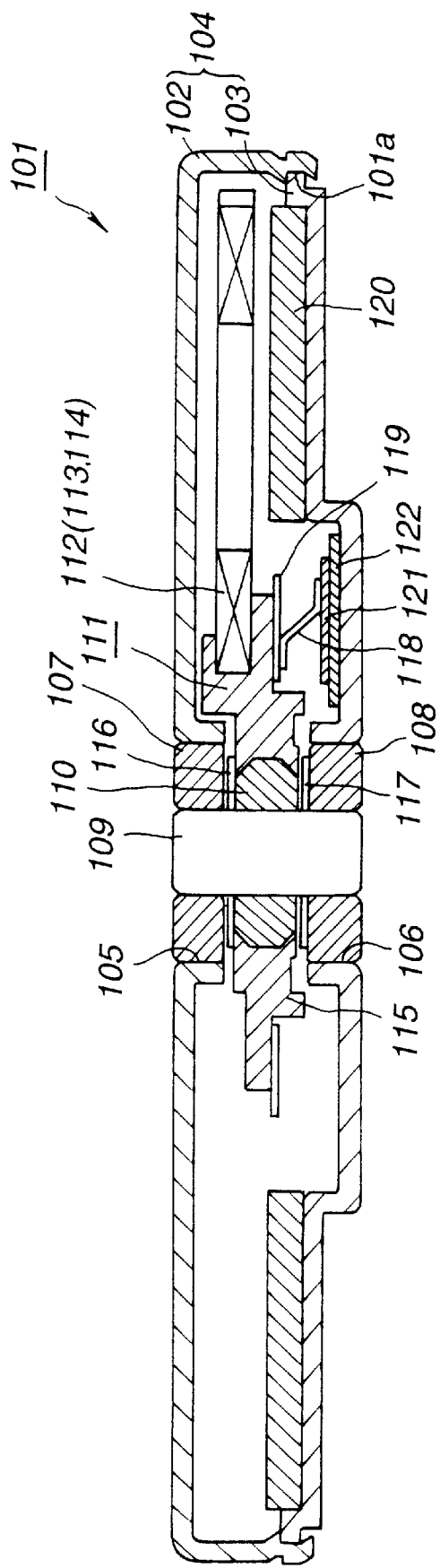
FIG. 20 is a cross-sectional view of the vibrating motor.

This vibration motor 101 includes a casing 104 having a flat cylindrically-shaped main body portion of the casing 102 and a disk-shaped bottom plate 103 closing an opening 101a of the main body portion of the casing 102, as shown in FIGS. 19 and 20. The main body portion of the casing 102 and the bottom plate 103 are formed with center openings 105, 106, respectively, in which are fitted metal bearings 107, 108, respectively. A driving shaft 109 is rotatably mounted via the metal bearings 107, 108. The driving shaft 109 is just long enough not to protrude from the casing 104.

Figure 21:
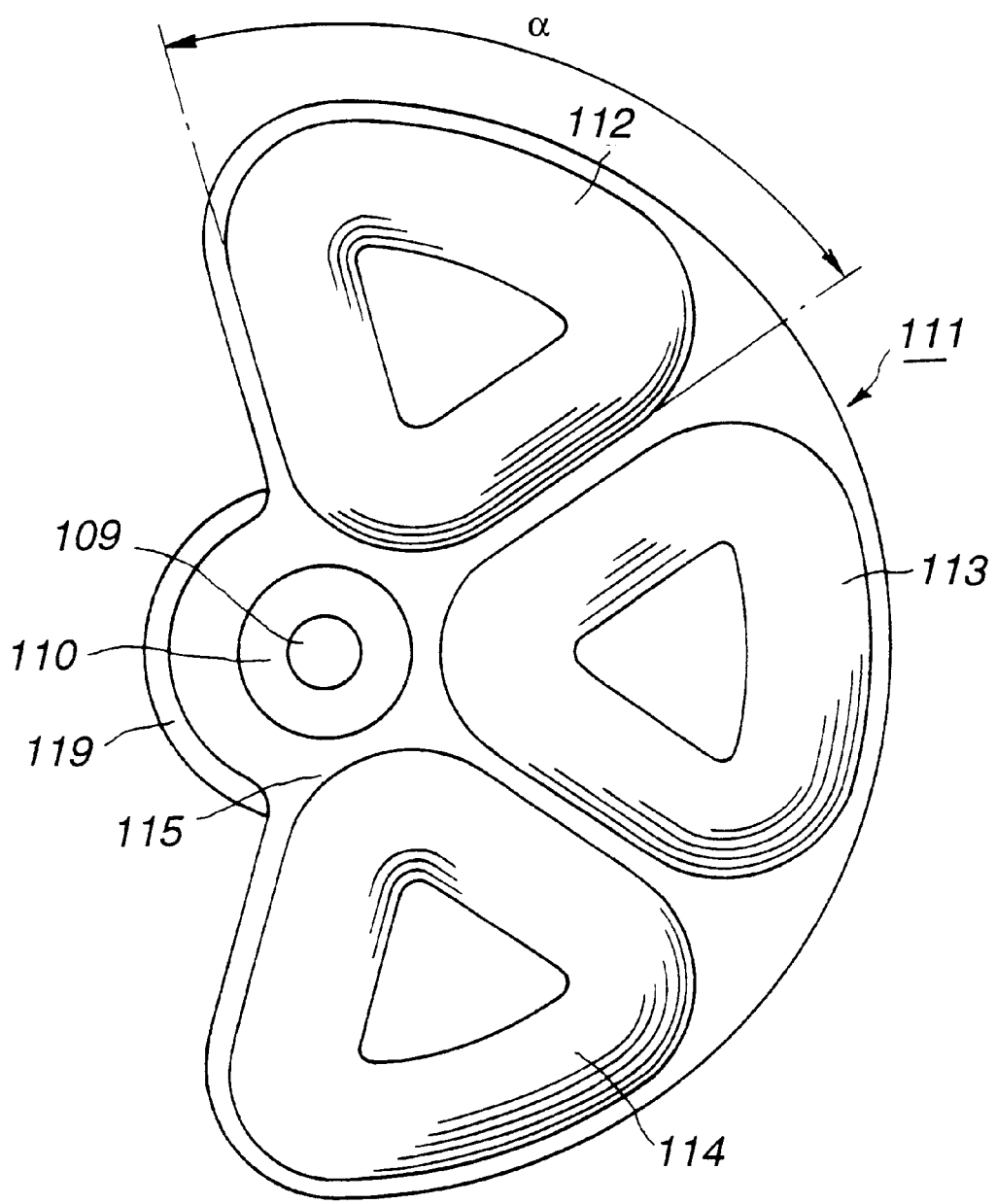
FIG. 21 is a plan view showing a rotor of the vibration motor.

On the driving shaft 109 is mounted a rotor 111 via a metal holder 110 mounted as-one on the driving shaft 109. On this rotor 111 are mounted three armature coils 112, 113, 114 offset towards one side of the driving shaft 109 operating as the center of rotation, so that the armature coils 112, 113, 114 are arrayed in a sector shape, as shown in FIG. 21. Specifically, the armature coils 112, 113, 114 are arrayed in substantially the sector shape having an opening angle α equal to 65° in a side-by-side relation with the driving shaft 109 as the center of rotation. The armature coils 112, 113, 114 are supported by a supporting base plate 115 insert-molded from synthetic resin along with the holder 110. Accordingly, the rotor 111 in its entirety presents a sector configuration.

Between the metal bearings 107, 108 and the holder 110 supporting the rotor 111 are interposed sliding plates 116, 117 for realizing smooth rotation of the rotor 111.

On the lower surface of the rotor 111 facing the bottom plate 103 is mounted a connection plate 119 carrying a brush 118. This connection plate 119 is electrically connected to the interconnected armature coils 112, 113, 114.

On the bottom plate 103 is mounted a ring-shaped stator magnet 120 for facing the rotor 111. On the bottom plate 103 is further mounted a brush base 121 on the inner rim side of the stator magnet 120 so that the brush base 121 is contacted by a brush 118 mounted on the rotor 111. The brush base 121 is mounted on a brush base plate 122 from which is led a power feed line 123.

In the above-described vibration motor 101, the rotor 111 is run in rotation by the driving current supplied via feed line 123 to the armature coils 112, 113, 114. Since the armature coils 112, 113, 114 of the rotor 111 are offset to one side with respect to the driving shaft 109, that is, with an offset relative to the driving shaft 109, the rotor 111 is run in rotation in the offset state, thus producing vibrations. In the example shown herein, the vibration motor can advantageously generate vibrations without any further eccentric member, since the rotor 111 itself has an eccentric configuration with respect to the drive shaft 109. Hence it can be manufactured in a compact form. Furthermore, since the motor does not require an external eccentric member, and hence the drive shaft may be enclosed in the casing 104, the motor can be made very thin.

Figure 22:
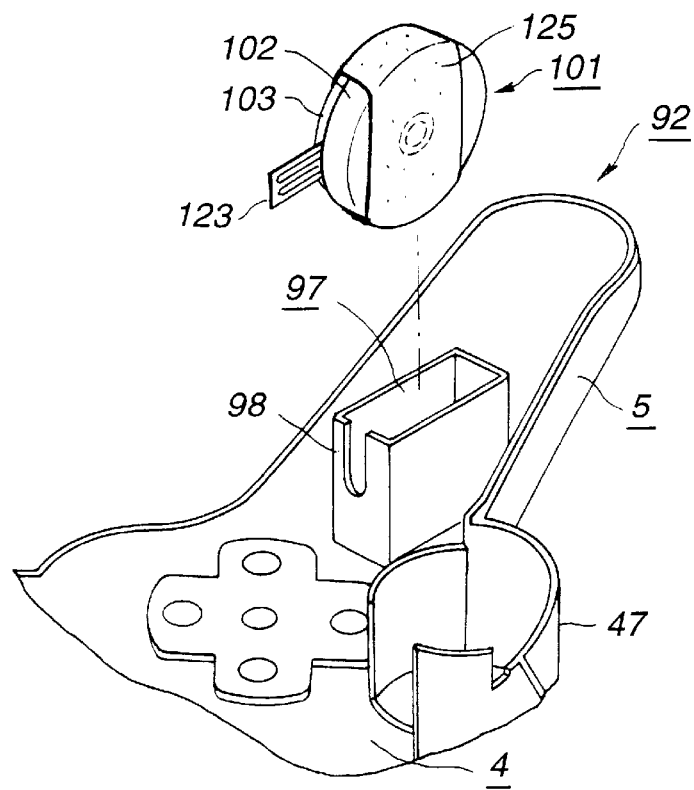
FIG. 22 is an exploded perspective view showing the state of mounting the vibration motor on a first grip portion.
Figure 23:
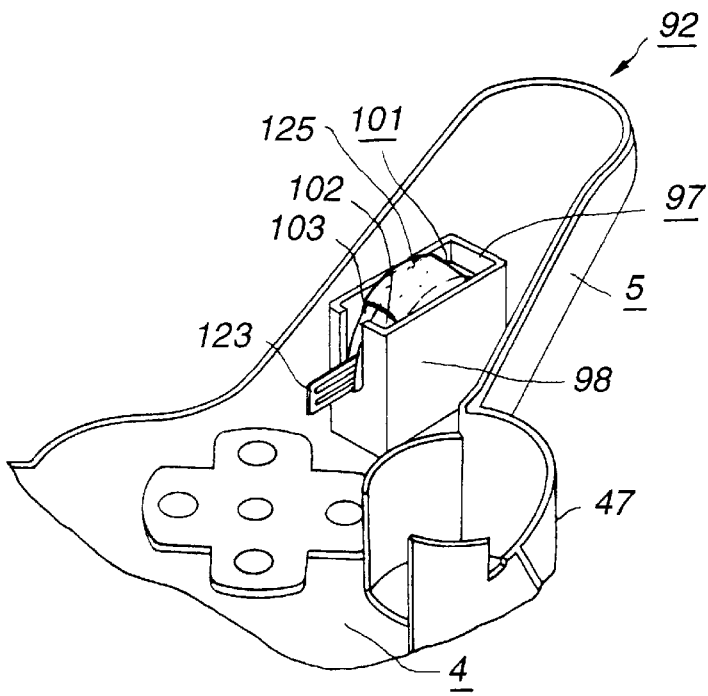
FIG. 23 is a perspective view showing the state on mounting the vibration motor on the first grip portion.

The above-described vibration motor 101 is snugly fitted in a rectangular-shaped tubular motor mounting portion 97 provided inwardly of the first grip 5 which is gripped by the left hand when the user holds the actuating device 1, as shown in FIGS. 22, 23. The outer rim of the vibration motor 101 is coated with an elastic sheet 125, such as a rubber sheet, as shown in FIG. 22. By having the vibration motor 101 mounted via elastic sheet 125 on the motor mounting portion 97, the vibration motor 101 is brought into intimate contact with a peripheral wall 98 constituting the motor mounting portion 97. Therefore, vibrations generated on driving the driving motor 101 may be reliably transmitted via motor mounting portion 97 to the first grip 5 to allow the user to feel the physical vibrations.

The vibration motor 101 may also be provided on the second grip 6. Alternatively, the driving motor 101 may be mounted on the portions of the main body unit 4 other than the first and second grips 5 and 6. That is, the vibration motor 101 may be mounted in any locations to which vibrations may be transmitted to the hand or fingers of the user actuating the actuating device 1. If the vibration motor 101 is provided on each of the first and second grips 5 and 6, it is possible to use the motors of different sizes or frequencies.

Although not shown, a printed circuit board comprised of an electronic circuit operating as communication means adapted for exchanging control signals, such as actuation command signals, with the main body portion of the game machine connected to the present actuating device 1.

Figure 24:
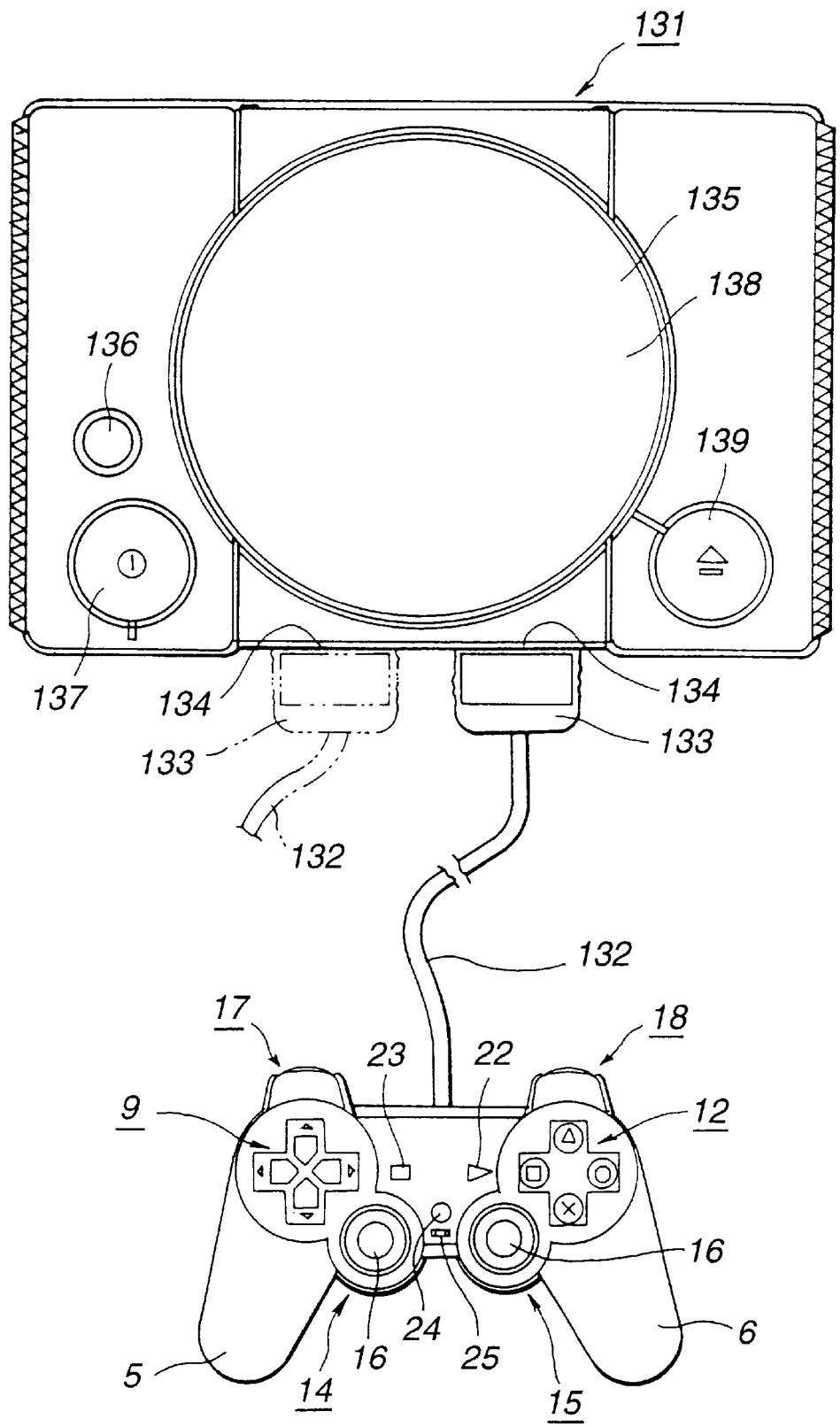
FIG. 24 is a plan view showing the state of connecting to the main body unit of the game machine the actuating device for the game machine according to the present invention.

The above-described actuating device 1 for the game machine is connected to a main body portion 131 of the game machine as shown in FIG. 24.

The connection of the actuating device 1 to the main body portion 131 of the game machine is made via a connection cord 132 pulled out from the mid portion on the front side of the main body unit 4. This connection cord 132 has an end connector 133 which is connected to a jack 134 provided on a lateral side of the main body portion 131 of the game machine for connecting the actuating device 1 to the main body portion 131 of the game machine.

The main body portion 131 of the game machine has plural jacks to enable connection of plural actuating devices, such as the actuating device 1.

Within the main body portion 131 of the game machine are enclosed a disc driving unit 135 for reproducing an optical disc having a game program recorded thereon and a picture processing unit for displaying the display character along with the background picture on the screen of the television receiver in accordance with the game program recorded on the optical disc. The main body portion 131 of the game machine is also provided with a reset switch 136 for resetting the game being executed, a power switch 137 and a lid opening actuating button 139 for opening a lid 138 adapted for opening/closing a disc mounting portion of the disc driving unit 137.

The main body portion 131 of the game machine is connected to a television receiver operating as a display device for displaying display characters along with the background picture for the game.

It is noted that, for vibrating the actuating device 1 for the game machine in its entirety by driving the vibration motor 101, it is necessary for the actuating device 1 and the main body portion 131 for the game machine to have a function for bidirectional communication.

This function for bidirectional communication can be implemented by connecting the actuating device 1 to the main body portion 131 of the game machine via a connector 133 for enabling bidirectional serial communication with the actuating device 1 for the game machine.

The structure for implementing the function for bidirectional communication is comprised of a serial I/O interface SIO for effecting serial communication with the main body portion 131 of the game machine, a one-chip microcomputer, which is a parallel I/O interface PIO, a CPU, a RAM and a ROM, and a motor driver 151 for rotationally driving the vibration motor 101, and is driven by the driving current supplied from a motor driver 151.

The main body portion 131 for the game machine is provided with a serial I/O interface SIO for having serial communication with the actuating device 1 for the game machine. If the connector 133 of the actuating device 1 for the game machine is connected in circuit, the main body portion 11 of the game machine is connected via this connector 133 to the serial I/O interface SIO of the actuating device 1 for the game machine for enabling bidirectional communication means, that is bidirectional serial communication. Other details of the structure of the main body portion 131 of the game machine are not explained for clarity.

The signal and control lines for having serial bidirectional communication include a signal line for data transmission for transmitting data from the main body portion 131 of the game machine to the actuating device 1 for the game machine, a signal line for data transmission RXD (Received X' Fer data) for transmitting data from the actuating device 1 for the game machine to the main body portion 131 of the game machine and a signal line SCK (serial clock) for serial synchronization for extracting data from signal lines TXD and RXD for data transmission. The signal and control lines also include a control line DTR (data terminal ready) for establishing or interrupting communication of the actuating device 1 for the game machine which is the terminal side and a control line for flow control DSR (data set ready) for effecting transmission of a large quantity of data.

The cables comprised of the signal and control lines for having this bidirectional serial communication also include, in addition to the signal and control lines, a cable from a power source 152, directly taken out from the power source on the side of the main body portion 131 of the game machine. This a power source cable 152 is connected to the motor driver 151 on the side of the actuating device 1 for the game machine for rotating the motor 54.

Turning to the operating sequence for the bidirectional serial communication, configured as described above, the main body portion 131 of the game machine shown in FIG. 24 first has communication with the actuating device 1 for the game machine and, in order to capture actuating data, which is the operating command signal obtained on actuating the first to sixth operation command information, the main body portion 131 first outputs selection data to the control line DTR. The result is that the main body portion 131 of the game machine checks to see that the device 1 has been selected by the control line DTR and is in a standby state to receive the next signal line TXD. The main body portion 131 of the game machine then sends out an identification code identifying the actuating device 1 to the signal line TXD for data transmission. The actuating device 1 then receives the identification code from the signal line TXD.

Since the identification code identifies the actuating device 1, communication with the main body portion 131 of the game machine is started. That is, control data or the like is sent from the main body portion 131 of the game machine via data transmission signal line TXD to the actuating device 1 for the game machine, while conversely the actuation data from the actuating buttons are sent over the data transmission signal line RXD is sent from the actuating device 1 to the main body portion 131 of the game machine. In this manner, bidirectional serial communication is had between the main body portion 131 of the game machine and the actuating device 1 for the game machine. This communication comes to a close by the main body portion 131 outputting selection discontinuing data over the control line DTR.

By implementing the bidirectional serial communication, actuation data mainly from the actuating buttons of the main body portion 131 of the game machine can be transmitted to the main body portion 131 of the game machine, whilst a driving command signal for driving the vibration motor 101 can be sent from the main body portion 131 over the data transmission signal line TXD to the actuating device 1. The command signal for rotating the vibration motor 101 is pre-set in the game program recorded on the optical disc which is the CD-ROM for game reproduced by the main body portion 131 of the game machine, and is fed back by dynamic transmission for a pre-set time from the main body portion 131 to the actuating device 1 itself responsive to the operational target of the game player.

Figure 26:
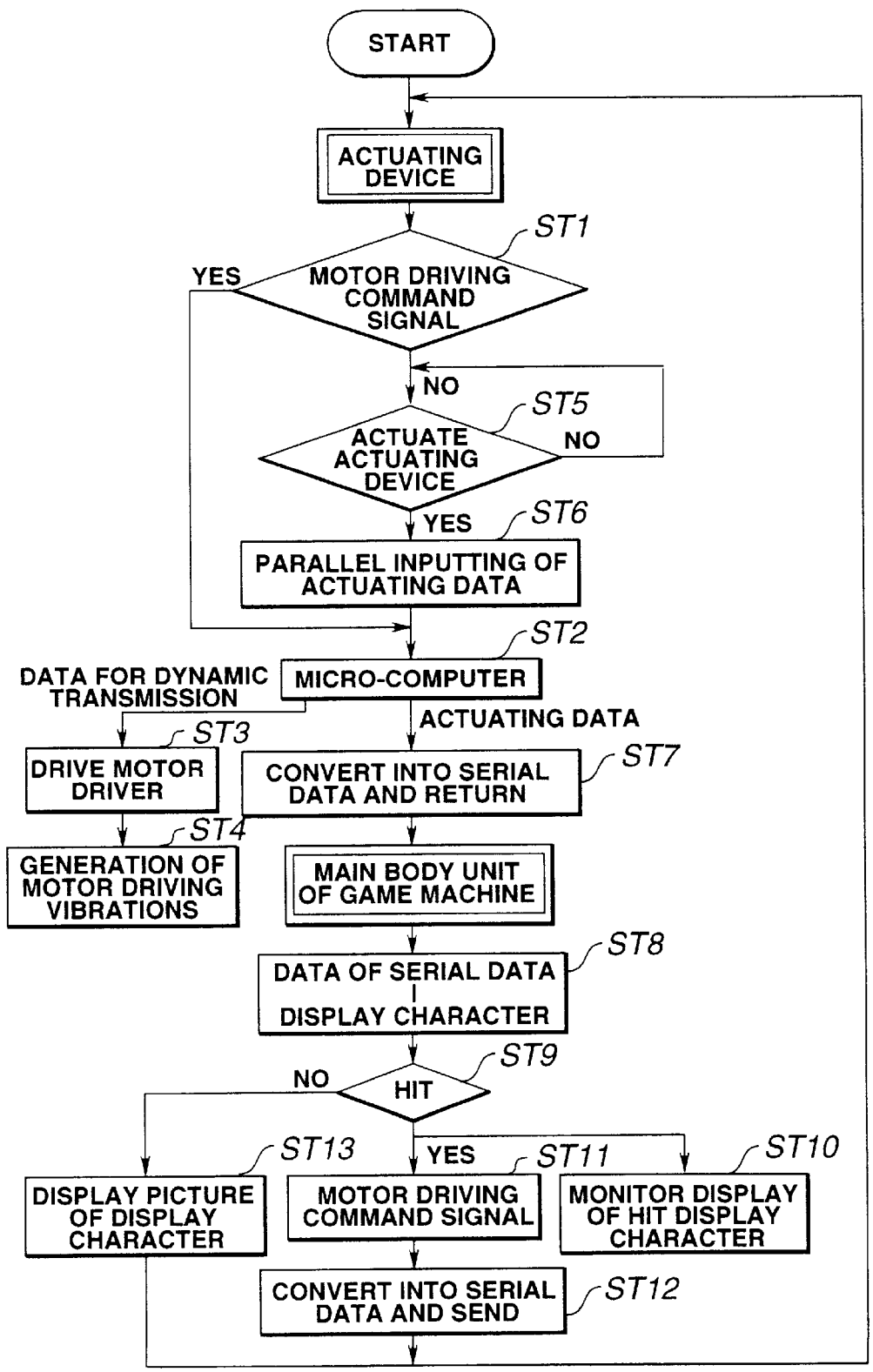
FIG. 26 is a flowchart for illustrating signal exchange between an actuating device for the game machine according to the present invention and the main body unit of the game machine.

The state in which the vibration motor 101 provided on the actuating device 1 is driven on the basis of the command signals issued by the main body portion 131 of the game machine is explained with reference to the flowchart shown in FIG. 26.

The CD-ROM, which is an optical disc having a specified game program recorded thereon, is loaded on the main body portion 131, and the game starting is set by a start switch 22 of the actuating device 1 for the game machine. Also, various functions are set by actuation of the selection switch 23 so that the game can be executed by actuation of the first to sixth actuators 9, 12, 14, 15, 17 and 18.

When starting the game, the micro-computer of the actuating device 1 for the game machine, comprised of the CPU, RAM and the ROM, perpetually monitors, via serial interface SIO, whether or not the hit motor driving command signal is sent from the main body portion 131 of the game machine via serial I/O interface SIO. This motor driving command signal includes control signals for controlling the driving current driving the vibration motor 101 shown in FIG. 25 and driving time for driving the vibration motor 101. If, in the course of the game, there is the motor driving control signal in the data transmitted from the main body portion 131, the motor driver 151 is driven and the driving current supplied from the main body portion 131 is supplied for a pre-set time to the vibration motor 101. That is, the motor driving control signal for driving the vibration motor 101, included on the data signal received by the actuating device 1 for the game machine, is checked at step ST1 and processed by the micro-computer at step ST2. At step ST3, the motor driver 151 shown in FIG. 25 is driven and vibrations are produced at step ST4.

Figure 25:
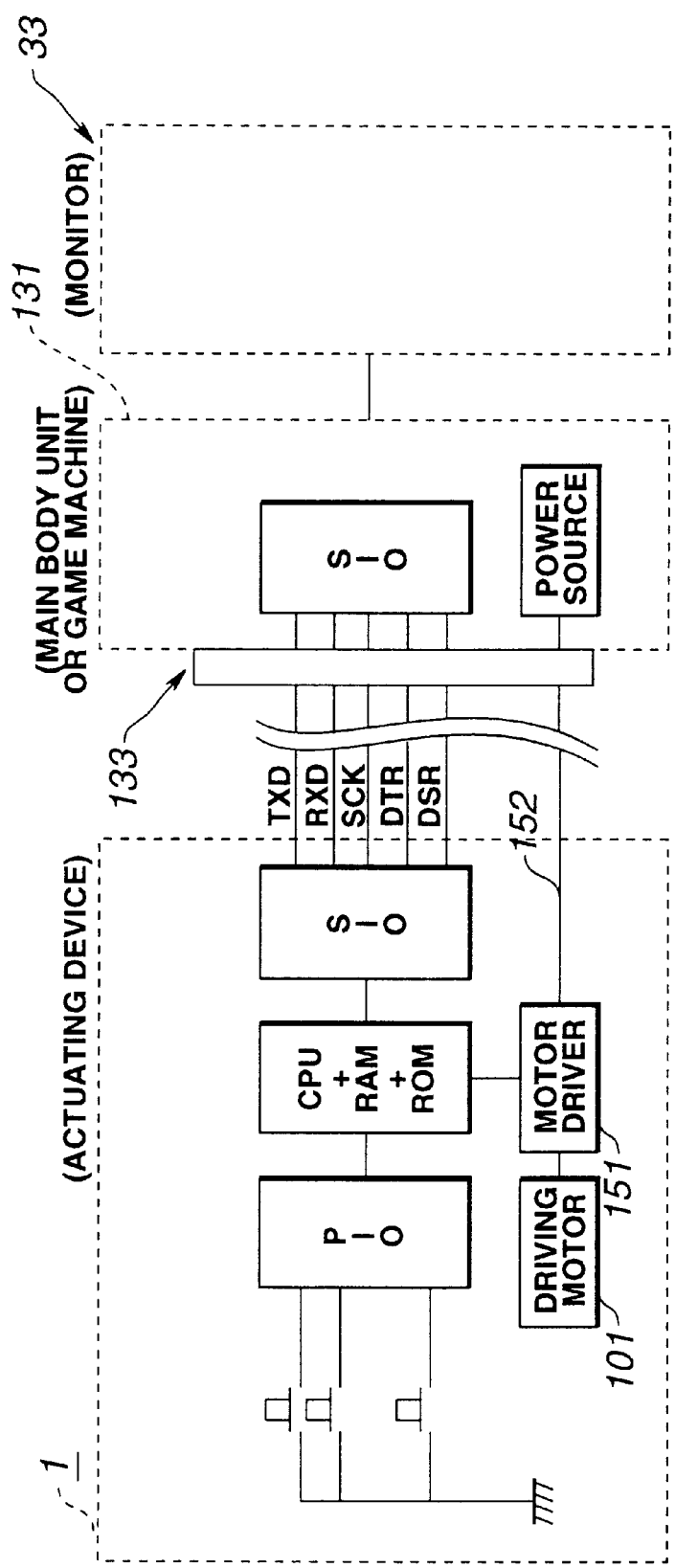
FIG. 25 is a block diagram showing essential portions executing bidirectional serial communication between the actuating device for the game machine according to the present invention and the main body unit of the game machine.

If the motor driving control signal is not found at step ST1, and any one of the first to sixth actuators 9, 12, 14, 15, 17 and 18 is actuated, the actuating data produced at step ST6 are entered to the micro-computer over the I/O interface PIO shown in FIG. 25.

The actuation data, entered to the micro-computer, are processed by the micro-computer at step ST2, and converted to serial I/O data at step ST7 so as to be transmitted to the main body portion 131 of the game machine via the serial I/O interface SIO shown in FIG. 25.

If the main body portion 131 of the game machine receives the actuation data converted into serial data, data of the display characters and the received serial data are compared at step ST8 to discriminate the hit state.

If, at step ST9, data of the display character coincide with the serial data, that is if there is a hit, the display character corresponding to the hit is displayed at step ST10 on the screen of the display device. The motor driving control signal is outputted at step ST11 and, at step ST12, the motor driving control signal is converted at step ST12 to serial data which is returned as a specified response signal via the serial I/O interface SIO to the actuating device 1 as specified response signal. If the motor driving control signal is detected by the micro-computer of the actuating device 1 as explained with reference to steps ST1, ST2 and ST3, the power is supplied from the motor driver 151 shown in FIG. 25 to the vibration motor 101 for driving the vibration motor 101 for setting the actuating device 1 for the game machine into vibrations.

If there is no hit, the display characters derived from the actuation of any of the actuators 9, 12, 14, 15, 17 and 18 are displayed on the screen of the display device. The next following operation is carried out by the actuation from the actuators 9, 12, 14, 15, 17 and 18 from the actuating device 1 for the game machine.

Although the motor driving control signal generated in case of a hit is received in the above-described embodiment as the specified response signal from the main body portion 131 of the game machine, it may also be sent by the unidirectional communication from the main body portion 131 to the actuating device 1.

With the above-described actuating device 1 for the game machine according to the present invention, the first to sixth actuators 9, 12, 14, 15, 17 and 18 can be actuated, using up to the maximum of ten fingers simultaneously, with the first and second grips 5 and 6 being held by both hands. The actuating device 1 can also be actuated by holding only one of the first and second grips 5 and 6. That is, by suitably actuating the first to sixth actuators 9, 12, 14, 15, 17 and 18, not only can the display characters be moved in a horizontal lane, but also can the display characters be rotated or moved with acceleration in order to enable actuation designed to cope with three-dimensional spatial pictures in a game. Since vibrations can be imparted to the operator during execution of the game, it is possible to execute the game superior in simulated presence feeling.

Thus, by using the actuating device 1 for the game machine according to the present invention, the display characters can execute complex movements, while vibrations can occasionally be imparted to the operator. Thus, it becomes possible to have the game executed with good simulated presence feeling. For example, such a game can be executed in which an aircraft or a submarine is moved in the three-dimensional space by way of executing a game n a tree-ais system.

In the actuating device and the system exploiting the actuating device, according to the present invention, a vibration motor set into vibrations by a signal from the main body unit of the actuating device is arranged in the actuating device for the game machine, and the motor itself is set into vibrations, the vibrations can be physically felt by the user, thus enabling a program excellent in the simulated presence feeling can be executed. In addition, the vibration motor can be reduced in size, thus enabling the actuating device employing the vibration motor to be reduced in size and weight.

In particular, in the case of a game machine, there is provided an actuator for entering to the main body portion of the game machine command signals enabling the display character displayed on the screen to be simultaneously moved and rotated, or perform an accelerated movement, or to modify the configuration. Accordingly, by using the actuating device in conjunction with the vibration motor, the display character an execute variegated operations. In addition, since the user can feel the vibrations during game execution thus enabling a television game superior in simulated presence feeling.

It should be noted that various changes may be made within the scope of the present invention and hence the present invention is not limited to the illustrated embodiments

What is claimed is:

1. A control unit connected to a machine for retrieving and processing information stored on a recording medium, said control unit operable by an operator to send instructions to said machine to execute a program stored on said recording medium, said control unit comprising:
   a housing;
   a plurality of finger-manipulatable controllers mounted on said housing;
   a pair of diverging grips which are molded integral with said housing and project from one side (rear side) of said housing facing said operator towards the player, said grips supportable by both palms of the operator, and
   a vibration motor mounted within at least one of said grips via an motor mounting portion, including:
      a casing;
      a freely rotatable shaft supported by said casing;
      an eccentric member mounted on said shaft, said eccentric member having a rotor mounted on said shaft and a plurality of coils mounted on said rotor; and
      a magnet mounted on said casing and facing said eccentric member; and
   means for supplying electric current to each of said coils for energizing said motor and setting said motor in vibration by the eccentric rotation of said eccentric member;
   wherein said housing, grips and controllers are sized and arranged so that said operator is able to manipulate said controllers with his fingers and feel the vibration of said energized motor through at least one of said grips.

2. The control unit of claim 1 wherein said motor adapter is molded integral with said grips, and wherein said vibration motor is mounted on said motor adapter via an elastic member.

3. The control unit of claim 1 wherein said plurality of controllers includes a first and a second controllers, said first controller having a first set of push buttons protruding from one end of the upper surface of said housing, and said second controller having a second set of push buttons protruding from the other end of the upper surface of said housing.

4. The control unit of claim 3 wherein said plurality of controllers further includes a third and a fourth controllers disposed at the respective opposing base sections of said grips, each of said third and fourth controllers having a rotary controller.

5. The control unit of claim 3 wherein said plurality of controllers further include a third controller in the form of a rotary controller between the pair of said grips.

6. The control unit of any one of claims 3, 4 and 5 wherein said plurality of controllers further include a fifth and a sixth controllers disposed on the front side which is the side remote from said operator of said housing, each of said controllers having a set of protruding push buttons.

7. The control unit of claims 6 wherein each of said fifth and sixth controllers has at least two vertically arranged push buttons.

8. The control unit of claims 1 wherein said machine is a game machine.

9. A control unit connected to a machine for retrieving and processing information stored on a recording medium, said control unit operable by an operator to send instructions to said machine to execute a program stored on said recording medium, said control unit comprising:
   a housing;
   a plurality of finger-manipulatable controllers mounted on said housing;
   a pair of grips which are molded integral with said housing and are supportable by both palms of the operator; and
   a vibration motor mounted within at least one of said grips via an motor mounting portion, including
      a casing;
      a freely rotatable shaft supported by said casing;
      an eccentric member mounted on said shaft, said eccentric member having a rotor mounted on said shaft and a plurality of coils mounted on said rotor; and
      a magnet mounted on said casing and facing said eccentric member; and
   means for supplying electric current to each of said coils for energizing said motor and setting said motor in vibration by the eccentric rotation of said eccentric member;

wherein said vibration motor is set in a vibratory motion caused by the rotation of said eccentric member when said motor is energized by said electric current, and transmits the vibrations to said operator via said grips.

10. The control unit of claim 9 wherein said motor adapter is molded integral with said grips, and wherein said vibration motor is mounted on said motor adapter via an elastic member.

11. The control unit of claim 9 wherein said plurality of controllers includes a first and a second controllers, said first controller having a first set of push buttons protruding from one end of the upper surface of said housing, and said second controller having a second set of push buttons protruding from the other end of the upper surface of said housing.

12. The control unit of claim 11 wherein said plurality of controllers further include a third controller in the form of a rotary controller between the pair of said grips.

13. The control unit of claim 11 wherein said plurality of controllers further include a fifth and a sixth controllers disposed on the opposite ends of the front side which is the side remote from the operator of said housing, each of said controllers having, a set of protruding push buttons.

14. The control unit of claim 13 wherein each of said fifth and sixth controllers has at least two vertically arranged push buttons.

15. The control unit of claim 9 wherein said machine is a game machine.

16. A system including a machine capable of retrieving data from a recording medium and of executing a program retrieved from said recording medium in response to an instruction given by an operator to said machine, said system comprising:

a control unit connected to said machine for controlling said machine, said control unit having:
  a housing;
  a plurality of finger-manipulatable controllers mounted on said housing;
  a pair of diverging grips which are molded integral with said housing and project from one side (rear side) of said housing facing said operator towards the player, said grips supportable by both palms of the operator, and
  a vibration motor mounted within at least one of grips via an motor mounting portion, including:
    a casing;
    a freely rotatable shaft supported by said casing;
    an eccentric member mounted on said shaft, said eccentric member having a rotor mounted on said shaft and a plurality of coils mounted on said rotor; and
    a magnet mounted on said casing and facing said eccentric member; and
  means for supplying electric current to each of said coils for energizing said motor and setting, said motor in vibration by the eccentric rotation of said eccentric member;

wherein said housing, grips and controllers are sized and arranged so that said operator is able to manipulate said controllers with his fingers and feel the vibration of said energized motor through at least one of said grips.

17. The system of claim 16 wherein said system is a game system.

18. A system including a machine capable of retrieving data from a recording medium and of executing a program retrieved from said recording medium in response to an instruction given by an operator to said machine, said system comprising:

a housing;
a plurality of finger-manipulatable controllers mounted on said housing;
a pair of diverging grips which are molded integral with said housing and are supportable by both palms of the operator; and
a vibration motor mounted within at least one of said grips via an motor mounting portion, including:
  a casing;
  a freely rotatable shaft supported by said casing;
  an eccentric member mounted on said shaft, said eccentric member having a rotor mounted on said shaft and a plurality of coils mounted on said rotor; and
  a magnet mounted on said casing and facing said eccentric member; and
means for supplying electric current to each of said coils for energizing said motor and setting said motor in vibration by the eccentric rotation of said eccentric member;

wherein said vibration motor is set in a vibratory motion caused by the rotation of said eccentric member when said motor is energized by said electric current, and transmits the vibrations to said operator via said grips.

19. The system of claim 18 wherein said system is a game system.

* * * * *

UNITED STATES PATENT AND TRADEMARK OFFICE
CERTIFICATE OF CORRECTION

PATENT NO. : 6,171,191 B1
DATED : Jan. 9, 2001
INVENTOR(S) : Hiroki Ogata, et al.

It is certified that error appears in the above-identified patent and that said Letters Patent is hereby corrected as shown below:

Column 5, line 47 change "1d", to read --11d--.

Column 18, line 2, claim 1, change "an" to read --a--.

Column 18, line 17, claim 2, change "adapter", to read --mounting portion--.

Column 19, line 2, claim 9, change "an" to read --a--.

Column 19, line 5, claim 10, change "adapter", to read --mounting portion--.

Signed and Sealed this

Twenty-ninth Day of May, 2001

Attest:

NICHOLAS P. GODICI

Attesting Officer

Acting Director of the United States Patent and Trademark Office